United States Patent
Wang et al.

(12) 
(10) Patent No.: US 12,232,061 B2
(45) Date of Patent: Feb. 18, 2025

(54) SIDELINK SYNCHRONIZATION TECHNIQUES

(71) Applicant: QUALCOMM Incorporated, San Diego, CA (US)

(72) Inventors: Kaidong Wang, San Diego, CA (US); Jelena Damnjanovic, Del Mar, CA (US); Sony Akkarakaran, Poway, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 17/407,796

(22) Filed: Aug. 20, 2021

(65) Prior Publication Data
US 2022/0086775 A1  Mar. 17, 2022

Related U.S. Application Data

(60) Provisional application No. 63/079,999, filed on Sep. 17, 2020, provisional application No. 63/079,993, filed on Sep. 17, 2020, provisional application No. 63/079,985, filed on Sep. 17, 2020.

(51) Int. Cl.
| H04W 56/00 | (2009.01) |
| H04W 88/04 | (2009.01) |
| H04W 92/18 | (2009.01) |

(52) U.S. Cl.
CPC ....... *H04W 56/001* (2013.01); *H04W 56/006* (2013.01); *H04W 88/04* (2013.01); *H04W 92/18* (2013.01)

(58) Field of Classification Search
None
See application file for complete search history.

(56) References Cited

U.S. PATENT DOCUMENTS

| 2016/0011910 A1* | 1/2016 | Kang .................. G06F 9/5044 718/104 |
| 2016/0183205 A1* | 6/2016 | Li ...................... H04W 56/001 370/350 |
| 2017/0006568 A1* | 1/2017 | Abedini ................ H04B 7/185 |
| 2018/0352525 A1* | 12/2018 | Li ...................... H04W 56/004 |
| 2018/0359788 A1* | 12/2018 | Abedini ............ H04W 56/001 |
| 2019/0379450 A1* | 12/2019 | Kamei .................. H04W 40/10 |
| 2020/0092685 A1* | 3/2020 | Fehrenbach ........ H04W 84/047 |
| 2020/0267671 A1* | 8/2020 | Chae .................... H04L 5/001 |
| 2021/0136707 A1* | 5/2021 | Xu .................... H04W 56/0015 |
| 2021/0168743 A1* | 6/2021 | Sheng .................. H04L 1/1614 |
| 2022/0167315 A1* | 5/2022 | Park .................. H04W 72/0446 |
| 2023/0309004 A1* | 9/2023 | Wei ...................... H04W 48/18 370/329 |

\* cited by examiner

*Primary Examiner* — Nicholas Sloms
(74) *Attorney, Agent, or Firm* — Arun Swain

(57) ABSTRACT

Certain aspects of the present disclosure provide techniques for sidelink synchronization in a network. A method that may be performed by a remote user equipment (UE) includes determining at least one synchronization priority associated with synchronization signals for synchronizing to a network, determining relay capability information associated with multiple relay UEs, selecting one relay UE of the multiple relay UEs, based on the synchronization priority and relay capability, and synchronizing to the network using at least one synchronization signal received from the selected one relay UE.

28 Claims, 18 Drawing Sheets

```
MasterInformationBlockSidelink ::=    SEQUENCE {
    sl-TDD-Config-r16               BIT STRING (SIZE (12)),
    inCoverage-r16                  BOOLEAN,
    directFrameNumber-r16           BIT STRING (SIZE (10)),
    slotIndex-r16                   BIT STRING (SIZE (7)),
    reservedBits-r16                BIT STRING (SIZE (2))
}
```

FIG. 9A

```
MasterInformationBlockSidelink ::=    SEQUENCE {
    sl-TDD-Config-r16               BIT STRING (SIZE (12)),
    inCoverage-r16                  BOOLEAN,
    directFrameNumber-r16           BIT STRING (SIZE (10)),
    slotIndex-r16                   BIT STRING (SIZE (7)),
    reservedBits-r16                BIT STRING (SIZE (2)),
    relay-Capability-Info
}
```

FIG. 9B

SIDELINK SYNCHRONIZATION TECHNIQUES

CROSS-REFERENCE TO RELATED APPLICATIONS

This application claims benefit of and priority to U.S. Provisional Application Nos. 63/079,999, 63/079,993, and 63/079,985, filed Sep. 17, 2020, all of which are hereby assigned to the assignee hereof and hereby expressly incorporated by reference herein in its entirety as if fully set forth below and for all applicable purposes.

INTRODUCTION

Field of the Disclosure

Aspects of present disclosure relate to wireless communications and, more particularly, to techniques for sidelink synchronization in a network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

Certain aspects can be implemented in a method for wireless communication performed by a user equipment (UE). The method generally includes determining at least one synchronization priority associated with synchronization signals for synchronizing to a network, determining relay capability information associated with multiple relay UEs, selecting one relay UE of the multiple relay UEs, based on the synchronization priority and relay capability, and synchronizing to the network using at least one synchronization signal received from the selected one relay UE.

Certain aspects can be implemented in an apparatus for wireless communication. The apparatus may include a memory comprising executable instructions and one or more processors configured to execute the executable instructions and cause the apparatus to: determine at least one synchronization priority associated with synchronization signals for synchronizing to a network, determine relay capability information associated with multiple relay UEs, select one relay UE of the multiple relay UEs, based on the synchronization priority and relay capability, and synchronize to the network using at least one synchronization signal received from the selected one relay UE.

Certain aspects can be implemented in an apparatus for wireless communication. The apparatus may include means for determining at least one synchronization priority associated with synchronization signals for synchronizing to a network, means for determining relay capability information associated with multiple relay UEs, means for selecting one relay UE of the multiple relay UEs, based on the synchronization priority and relay capability, and means for synchronizing to the network using at least one synchronization signal received from the selected one relay UE.

Certain aspects can be implemented in a non-transitory computer-readable medium for wireless communication. The non-transitory computer-readable medium may include executable instructions that, when executed by one or more processors of an apparatus, cause the apparatus to: determine at least one synchronization priority associated with synchronization signals for synchronizing to a network, determine relay capability information associated with multiple relay UEs, select one relay UE of the multiple relay UEs, based on the synchronization priority and relay capability, and synchronize to the network using at least one synchronization signal received from the selected one relay UE.

Certain aspects can be implemented in a computer program product for wireless communication. The computer program product may be embodied on a computer-readable storage medium and may comprising code for: determining at least one synchronization priority associated with synchronization signals for synchronizing to a network, determining relay capability information associated with multiple relay UEs, selecting one relay UE of the multiple relay UEs, based on the synchronization priority and relay capability, and synchronizing to the network using at least one synchronization signal received from the selected one relay UE.

Certain aspects can be implemented in a method for wireless communication performed by a user equipment (UE). The method generally includes receiving a broadcast transmission from multiple relay UEs in a network, wherein each broadcast transmission includes relay capability information of a relay UE of the multiple relay UEs, selecting one relay UE of the multiple relay UEs based on the relay capability information, and synchronizing to the network using at least one synchronization signal received from the selected one relay UE.

Certain aspects can be implemented in an apparatus for wireless communication. The apparatus may include a memory comprising executable instructions and one or more processors configured to execute the executable instructions and cause the apparatus to: receive a broadcast transmission from multiple relay UEs in a network, wherein each broadcast transmission includes relay capability information of a relay UE of the multiple relay UEs, select one relay UE of the multiple relay UEs based on the relay capability information, and synchronize to the network using at least one synchronization signal received from the selected one relay UE.

Certain aspects can be implemented in an apparatus for wireless communication. The apparatus may include means for receiving a broadcast transmission from multiple relay UEs in a network, wherein each broadcast transmission includes relay capability information of a relay UE of the multiple relay UEs, means for selecting one relay UE of the multiple relay UEs based on the relay capability information, and means for synchronizing to the network using at least one synchronization signal received from the selected one relay UE.

Certain aspects can be implemented in a non-transitory computer-readable medium for wireless communication. The non-transitory computer-readable medium may include executable instructions that, when executed by one or more processors of an apparatus, cause the apparatus to: receive a broadcast transmission from multiple relay UEs in a network, wherein each broadcast transmission includes relay capability information of a relay UE of the multiple relay UEs, select one relay UE of the multiple relay UEs based on the relay capability information, and synchronize to the network using at least one synchronization signal received from the selected one relay UE.

Certain aspects can be implemented in a computer program product for wireless communication. The computer program product may be embodied on a computer-readable storage medium and may comprising code for: receiving a broadcast transmission from multiple relay UEs in a network, wherein each broadcast transmission includes relay capability information of a relay UE of the multiple relay UEs, selecting one relay UE of the multiple relay UEs based on the relay capability information, and synchronizing to the network using at least one synchronization signal received from the selected one relay UE.

Certain aspects can be implemented in a method for wireless communication performed by a user equipment (UE). The method generally includes generating a transmission including relay capability information of the relay UE and transmitting the relay capability information.

Certain aspects can be implemented in an apparatus for wireless communication. The apparatus may include a memory comprising executable instructions and one or more processors configured to execute the executable instructions and cause the apparatus to: generate a transmission including relay capability information of the relay UE and transmit the relay capability information.

Certain aspects can be implemented in an apparatus for wireless communication. The apparatus may include means for generating a transmission including relay capability information of the relay UE and means for transmitting the relay capability information.

Certain aspects can be implemented in a non-transitory computer-readable medium for wireless communication. The non-transitory computer-readable medium may include executable instructions that, when executed by one or more processors of an apparatus, cause the apparatus to: generate a transmission including relay capability information of the relay UE and transmit the relay capability information.

Certain aspects can be implemented in a computer program product for wireless communication. The computer program product may be embodied on a computer-readable storage medium and may comprising code for: generating a transmission including relay capability information of the relay UE and transmitting the relay capability information.

Certain aspects can be implemented in a method for wireless communication performed by a user equipment (UE). The method generally includes determining a relay capability configuration for selecting one relay UE of multiple relay UEs for synchronizing to a network, selecting one relay UE of the multiple relay UEs, based on the relay capability configuration, and synchronizing to the network using at least one synchronization signal received from the selected one relay UE.

Certain aspects can be implemented in an apparatus for wireless communication. The apparatus may include a memory comprising executable instructions and one or more processors configured to execute the executable instructions and cause the apparatus to: determine a relay capability configuration for selecting one relay UE of multiple relay UEs for synchronizing to a network, select one relay UE of the multiple relay UEs, based on the relay capability configuration, and synchronize to the network using at least one synchronization signal received from the selected one relay UE.

Certain aspects can be implemented in an apparatus for wireless communication. The apparatus may include means for determining a relay capability configuration for selecting one relay UE of multiple relay UEs for synchronizing to a network, means for selecting one relay UE of the multiple relay UEs, based on the relay capability configuration, and means for synchronizing to the network using at least one synchronization signal received from the selected one relay UE.

Certain aspects can be implemented in a non-transitory computer-readable medium for wireless communication. The non-transitory computer-readable medium may include executable instructions that, when executed by one or more processors of an apparatus, cause the apparatus to: determine a relay capability configuration for selecting one relay UE of multiple relay UEs for synchronizing to a network, select one relay UE of the multiple relay UEs, based on the relay capability configuration, and synchronize to the network using at least one synchronization signal received from the selected one relay UE.

Certain aspects can be implemented in a computer program product for wireless communication. The computer program product may be embodied on a computer-readable storage medium and may comprising code for: determining a relay capability configuration for selecting one relay UE of multiple relay UEs for synchronizing to a network, selecting one relay UE of the multiple relay UEs, based on the relay capability configuration, and synchronizing to the network using at least one synchronization signal received from the selected one relay UE.

Certain aspects can be implemented in a method for wireless communication performed by a base station (BS). The method generally includes determining a relay capability configuration for selecting one relay UE of multiple relay UEs for synchronizing to the network and transmitting the relay capability configuration to a remote UE.

Certain aspects can be implemented in an apparatus for wireless communication. The apparatus may include a memory comprising executable instructions and one or more processors configured to execute the executable instructions and cause the apparatus to: determine a relay capability configuration for selecting one relay UE of multiple relay UEs for synchronizing to the network and transmit the relay capability configuration to a remote UE.

Certain aspects can be implemented in an apparatus for wireless communication. The apparatus may include means for determining a relay capability configuration for selecting one relay UE of multiple relay UEs for synchronizing to the network and means for transmitting the relay capability configuration to a remote UE.

Certain aspects can be implemented in a non-transitory computer-readable medium for wireless communication. The non-transitory computer-readable medium may include executable instructions that, when executed by one or more processors of an apparatus, cause the apparatus to: determine a relay capability configuration for selecting one relay UE of multiple relay UEs for synchronizing to the network and transmit the relay capability configuration to a remote UE.

Certain aspects can be implemented in a computer program product for wireless communication. The computer program product may be embodied on a computer-readable storage medium and may comprising code for: determining a relay capability configuration for selecting one relay UE of multiple relay UEs for synchronizing to the network and transmitting the relay capability configuration to a remote UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9A shows a first format of a sidelink master information bock (MIB-SL), in accordance with certain aspects of the present disclosure.

FIG. 9B shows a second format of a MIB-SL, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
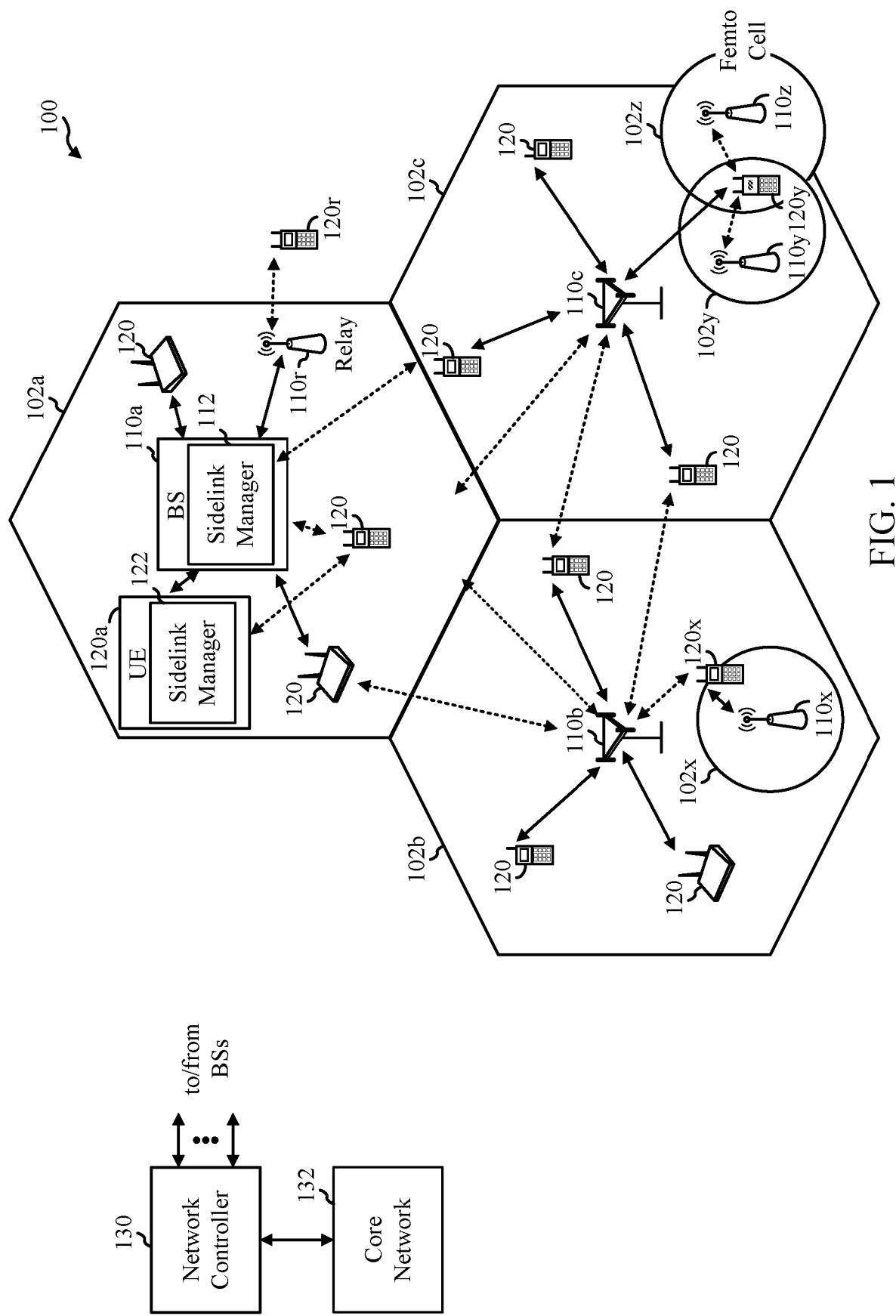
FIG. 1 is a block diagram conceptually illustrating an example wireless communication network, in accordance with certain aspects of the present disclosure.

Aspects of present disclosure provide apparatus, methods, processing systems, and computer readable mediums for selection of a relay user equipment (UE) from multiple relay UEs, by a remote UE, based on relay capability information associated with the relay UE and/or synchronization priority associated with a synchronization signal received from the relay UE, for synchronization of the remote UE to a network using the synchronization signal received from the selected relay UE, in a sidelink communication.

The following description provides examples of techniques for synchronization of UEs in a sidelink communication, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. The RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

The NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. The NR supports beamforming and beam direction may be dynamically configured. Multiple-input multiple-output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. The wireless communication network 100 may be an NR system (e.g., a 5G NR network).

The wireless communication network 100 may include base stations (BSs) 110*a-z* (each also individually referred to herein as BS 110 or collectively as BSs 110). The wireless communication network 100 may further include user equipment (UEs) 120*a-y* (each also individually referred to herein as UE 120 or collectively as UEs 120). As shown in FIG. 1, the wireless communication network 100 may be in communication with a core network 132. The core network 132 may be in communication with the BSs 110 and/or the UEs 120 in the wireless communication network 100 via one or more interfaces.

The UEs 120 may be configured for a sidelink communication. Prior to direct communications between the UEs 120, each UE 120 may be synchronized. In some cases, a UE 120*a* may be a remote UE or a relay UE, which may be synchronized to the core network 132 using a synchronization signal from one of the other UEs 120. The UE 120*a* may include a sidelink manager 122. The sidelink manager 122 may be configured to perform the operations illustrated in FIGS. 8, 11, 12, 13, 14, and 16, as well as other operations described herein for sidelink synchronization. Additionally, as shown, the BS 110*a* includes a sidelink manager 112, which may be configured to perform the operations illustrated in FIGS. 15-16, as well as other operations described herein for sidelink synchronization.

The BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in the wireless communication network 100 through various types of backhaul interfaces (e.g., a direct physical connection, a wireless connection, a virtual network, or the like) using any suitable transport network. In the example shown in FIG. 1, BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. The BS 110 may support one or multiple cells.

The BSs 110 may communicate with the UEs 120 in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., a relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
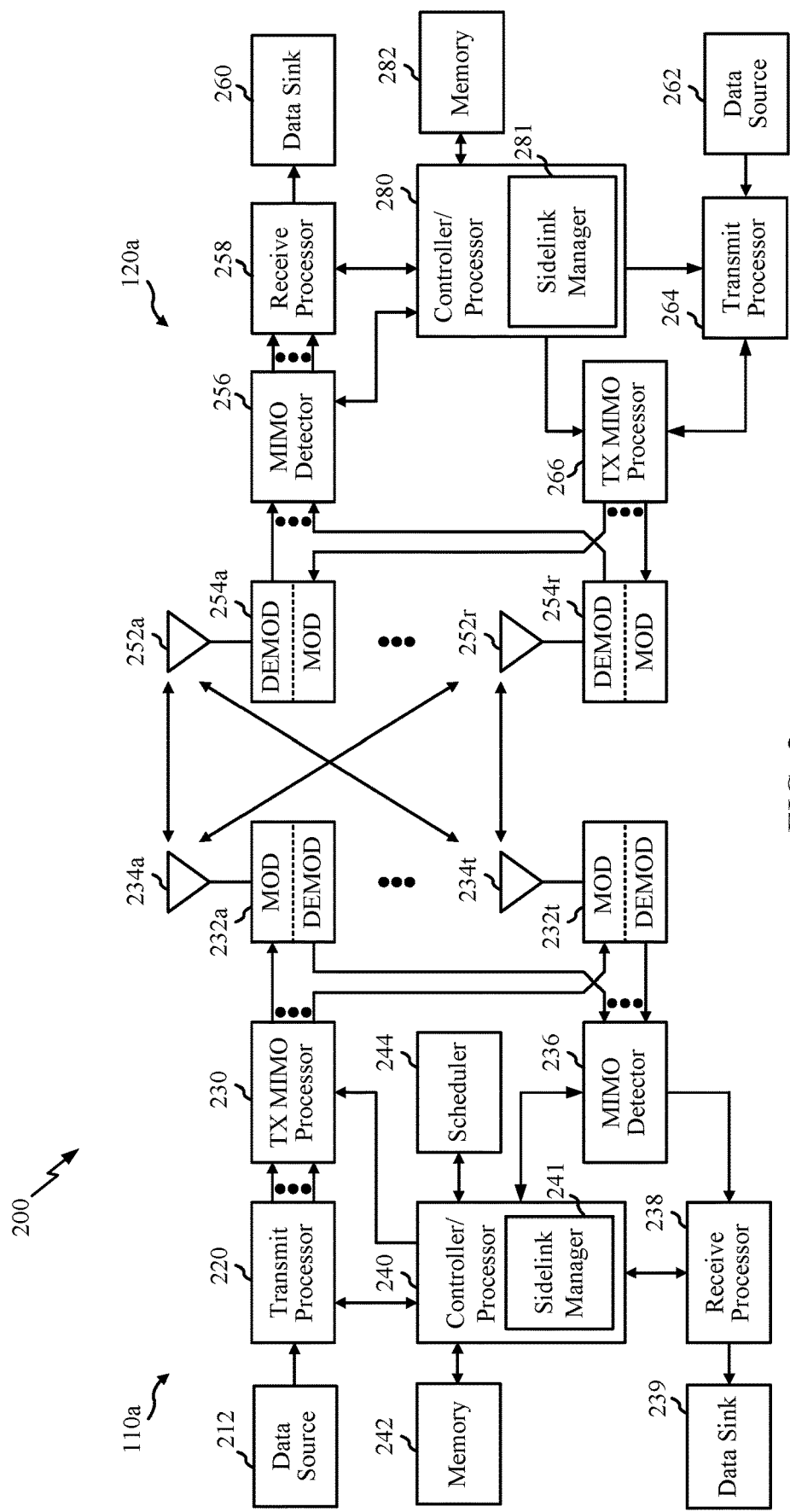
FIG. 2 is a block diagram conceptually illustrating a design of an example a base station (BS) and a user equipment (UE), in accordance with certain aspects of the present disclosure.

FIG. 2 illustrates example components of a BS 110a and a UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and the control information to obtain data symbols and control symbols, respectively. The transmit processor 220 may also generate reference symbols, such as for a primary synchronization signal (PSS), a secondary synchronization signal (SSS), a PBCH demodulation reference signal (DMRS), and a channel state information reference signal (CSI-RS). A transmit (TX) MIMO processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. The downlink signals from the MODs in transceivers 232a-232t may be transmitted via the antennas in transceivers 234a-234t, respectively.

At the UE 120a, antennas 252a-252r may receive the downlink signals from the BS 110a and may provide received signals to demodulators (DEMODs) in transceivers 254a-254r, respectively. Each DEMOD in transceivers 254a-254r may condition (e.g., filter, amplify, downconvert, and digitize) a respective received signal to obtain input samples. Each DEMOD in transceivers 254a-254r may further process the input samples (e.g., for OFDM, etc.) to obtain received symbols. A MIMO detector 256 may obtain received symbols from all the DEMODs in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the DEMODs in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for the BS 110a and the UE 120a, respectively. A scheduler 244 may schedule UEs for data transmission on the downlink and/or the uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a may include a sidelink manager 241. The sidelink manager 241 may be configured to perform the operations illustrated in FIGS. 15-16, as well as other operations described herein for sidelink synchronization. Additionally, as shown in FIG. 2, the controller/processor 280 of the UE 120a may include a sidelink manager 281. The sidelink manager 281 may be configured to perform the operations illustrated in FIGS. 8, 11, 12, 13, 14, and 16, as well as other operations described herein for sidelink synchronization.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
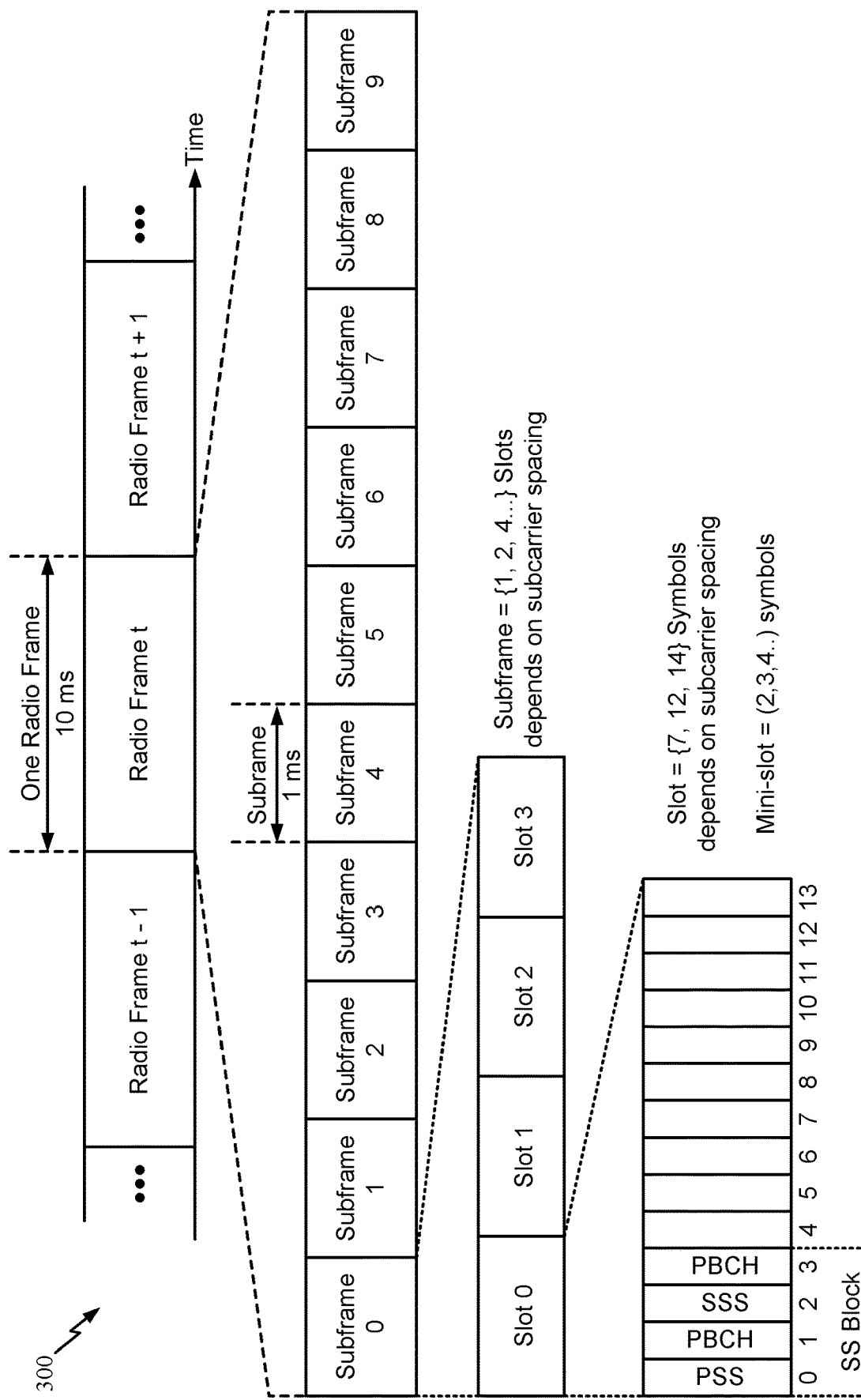
FIG. 3 is an example frame format for certain wireless communication systems (e.g., a new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Example Sidelink Communication

Figure 4B:
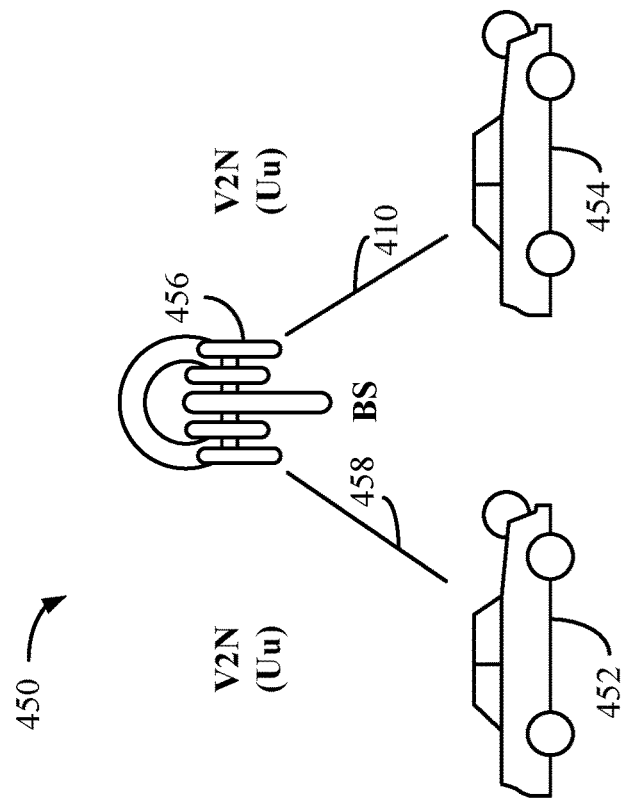
FIG. 4A and FIG. 4B show diagrammatic representations of example vehicle to everything (V2X) systems, in accordance with certain aspects of the present disclosure.
Figure 4A:
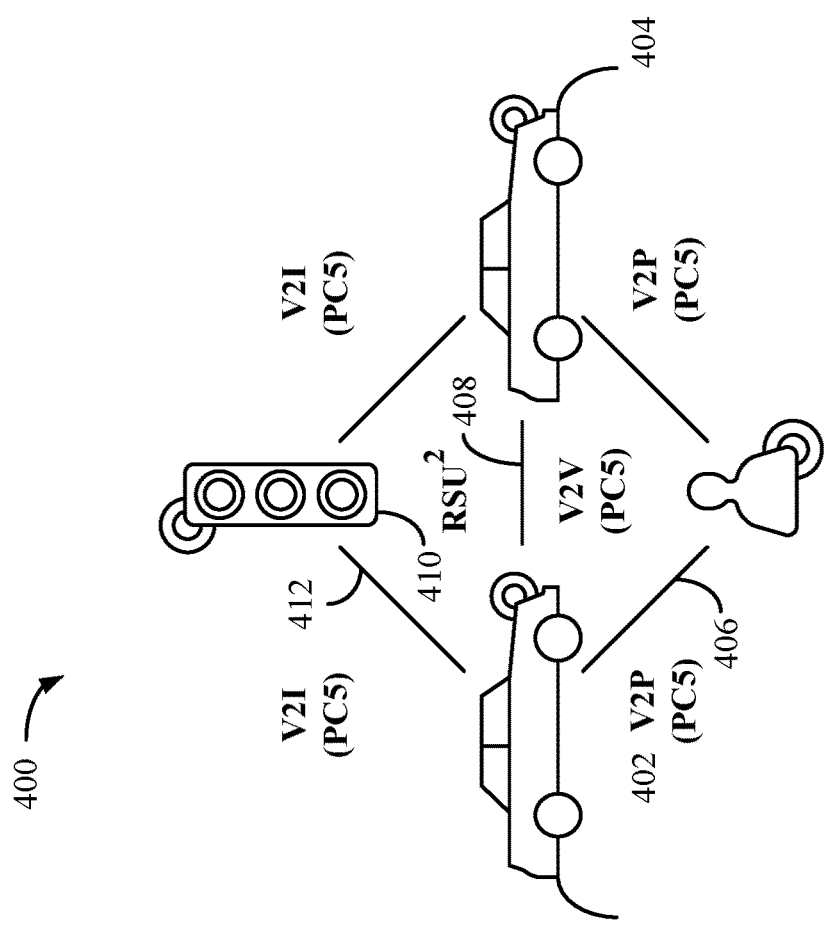

FIG. 4A and FIG. 4B show diagrammatic representations of example vehicle to everything (V2X) systems, in accordance with some aspects of the present disclosure. Vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Figure 5A:
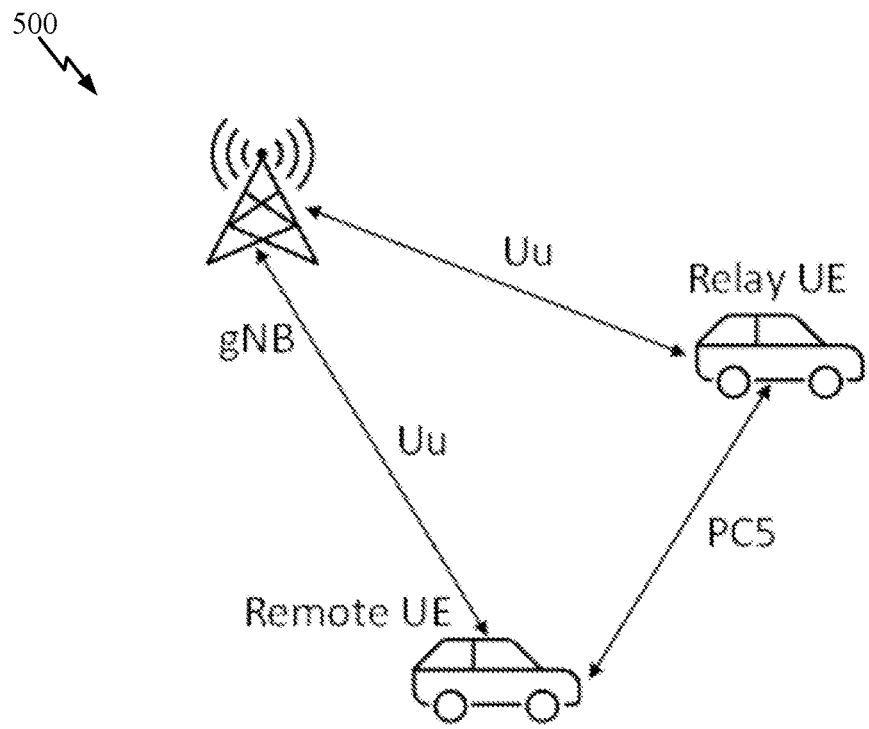
FIG. 5A and FIG. 5B show diagrammatic representations of example vehicle to vehicle (V2V) systems, in accordance with certain aspects of the present disclosure.
Figure 5B:
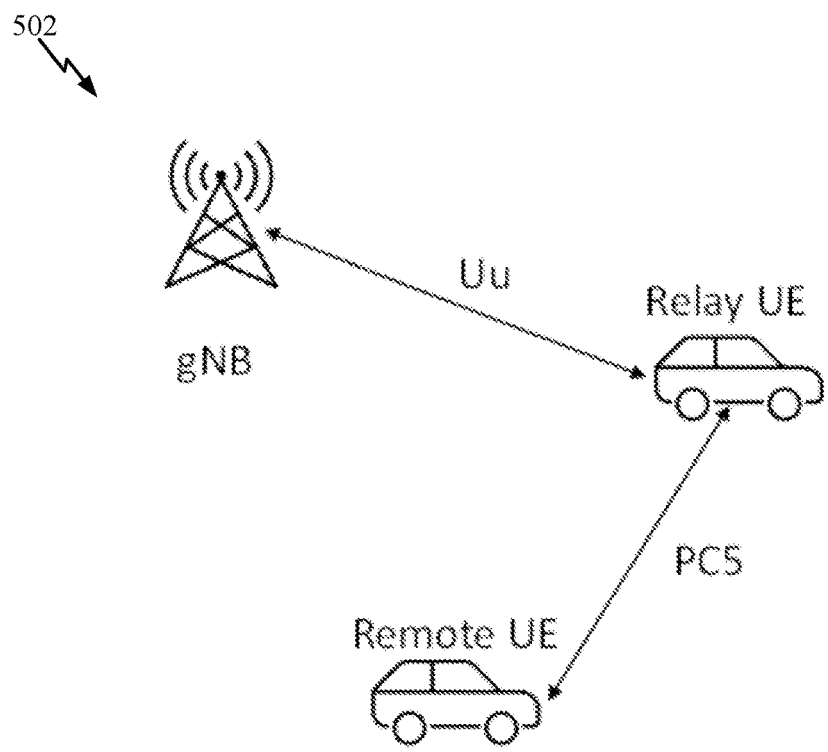

In some cases, vehicles (e.g., UEs) within a V2V system may have a relay capability and operate as relay UEs. FIGS. 5A-5B illustrate example V2V systems 500, 502 in which certain UEs may operate as relay UEs. As shown, the V2V systems 500, 502, illustrated in FIGS. 5A-5B may include a base station (e.g., gNB), a first vehicle (e.g., a remote UE) and a second vehicle (e.g., second UE). In some cases, the V2V systems 500, 502 may be an example of the V2X/V2V systems 400, 450 described above with reference to FIGS. 4A and 4B.

In some cases, the remote UE may communicate directly with the gNB via a Uu interface or indirectly with the gNB via the relay UE via a PC5 interface. For example, as illustrated in FIG. 5A, the remote UE may communicate directly with the gNB using the Uu interface or may communicate with the gNB indirectly via the relay UE using a PC5 interface. In other cases, as illustrated in FIG. 5B, the remote UE may only indirectly communicate with the gNB via the relay UE using the PC5 interface. For example, in some cases, the remote UE may communicate with the relay UE via a PC5 interface to send a message. Thereafter, the relay UE may forward this message to the gNB via the Uu interface. Similarly, the gNB may communicate with the remote UE via the relay UE.

In some cases, relay UEs within the V2V systems 500, 502 illustrated in FIGS. 5A-5B may have or be associated with different relay capabilities. For example, in some cases, the relay capabilities may include or may be associated with a discontinuous reception (DRX) cycle of the relay UE, traffic on a Uu link and/or PC5 link associated with the relay UE, a channel quality associated with a sidelink (e.g., PC5 link), a number of other UEs that the relay UE is connected to, a time source of the relay UE, and/or channel state information (CSI) associated with a Uu link of the relay UE.

Example Sidelink Synchronization Techniques

Figure 6:
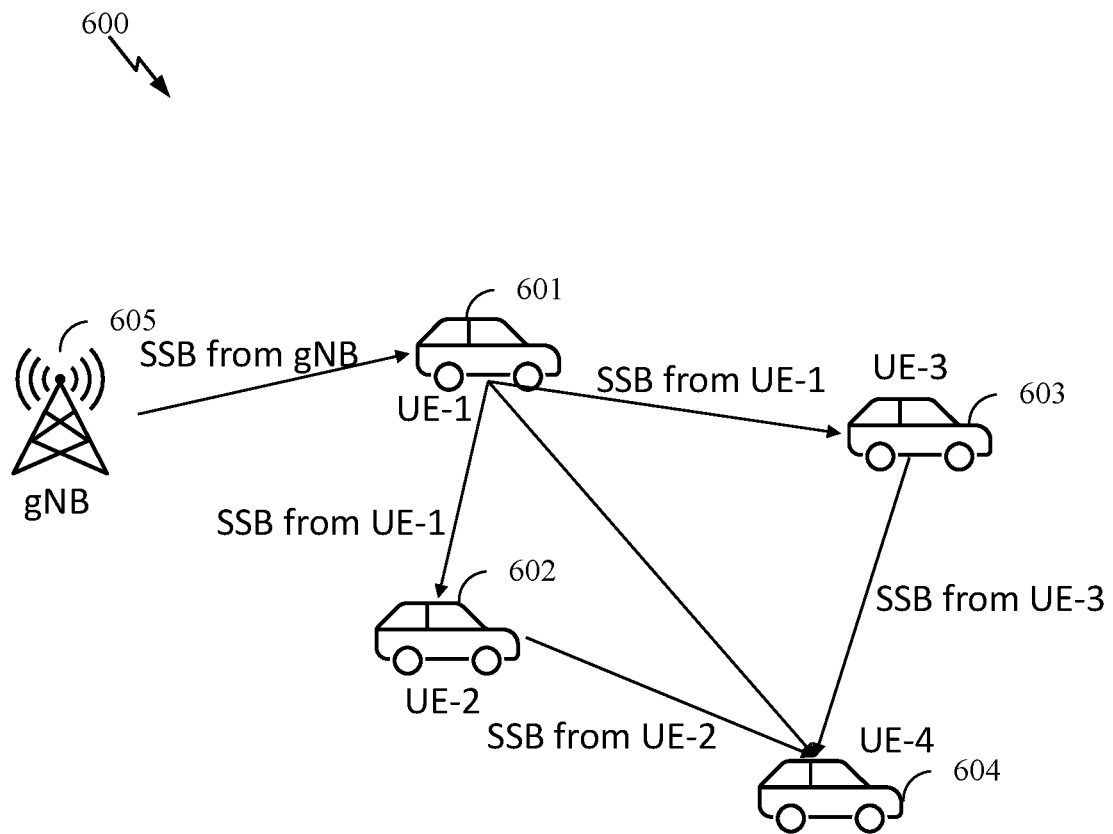
FIG. 6 shows a diagrammatic representation of an example V2V system, in accordance with certain aspects of the present disclosure.

In some cases, to communicate in a V2V system on a sidelink, a base station (BS) (e.g., a gNodeB (gNB), such as BS 110a) and UEs (e.g., relay UEs and remote UEs, such as UE 120a) may need to be synchronized. An example of synchronizing within the V2V system is illustrated in FIG. 6. For example, FIG. 6 shows an example V2V system 600 implementing aspects of FIGS. 4A-4B and 5A-5B. As shown, in one example, the V2V system 600 illustrated in FIG. 6 may include a first UE 601 (e.g., a vehicle), a second UE 602, a third UE 603, and a fourth UE 604. The V2V system 600 may further include a BS 605. In some cases, the BS 605 may be an example of the BS 110 illustrated in FIG. 1 and include a long term evolution (LTE) evolved node B (eNB) or a fifth generation (5G) new radio (NR) next generation node B (gNB).

In the V2V system 600, nodes, such as UEs 601-604 and the BS 605, may be synchronized. The nodes may be synchronized using multiple synchronization techniques. One technique is Global Navigation Satellite System (GNSS)-based synchronization, which prioritizes GNSS signals for synchronization. Another technique is gNB/eNB-based synchronization, which prioritizes eNB/gNB synchronization signal blocks (SSBs) for synchronization.

In some cases, nodes in the V2V system 600 may receive synchronization signals from multiple synchronization sources. For example, in some cases, the nodes (e.g., UEs 601-604) may receive the synchronization signals from the BS 605. In other cases, the nodes (e.g., UEs 601-604) may receive the synchronization signals from the GNSS. In either cases, each node may synchronize to the V2V system 600/network using a synchronization signal received from a synchronization source based on a priority associated with that synchronization source and/or synchronization signal, as explained below.

In the V2V system 600, when the UEs turn on, each UE may search for a nearby NR network. For example, in some cases, while searching for a nearby NR network, the UEs (e.g., the first UE 601) may receive the synchronization signals from the BS 605. However, in other cases, the UEs in the V2V system 600 (e.g., the second UE 602, the third UE 603, the fourth UE 604) may not receive the synchronization signals from the BS, but may instead search for and receive the synchronization signals from other UEs in the V2V system 600 (e.g., the first UE 601).

For example, as shown, when the first UE 601 turns on, the first UE 601 may search for the nearby NR network and may discover the BS 605, which belongs to the NR network. To assist with discovery and synchronization with the BS 605, the BS 605 may transmit an SSB that includes, for example, a primary synchronization signal (PSS), a secondary synchronization signal (SSS), and a physical broadcast channel (PBCH) (e.g., including a master information block (MIB)) periodically in different transmit directions (e.g., beams). Accordingly, the first UE 601 may receive the SSB from the BS 605 and may synchronize to the NR network based on the received SSB. In this case, the BS 605 may function as the first UE 601's synchronization source. Thereafter, once the first UE 601 is synchronized, the first UE 601 may perform an attach procedure with the BS 605 and begin camping on a cell associated with the BS 605.

While the first UE 601 may receive the synchronization signals from the BS 605 and use the BS 605 as a synchronization source, the second UE 602 and the third UE 603 may instead receive SSBs from other UEs, such as the first UE 601, and may use the first UE 601 as a synchronization source. For example, when the second UE 602 and the third UE 603 turn on, the second UE 602 and the third UE 603 may search for the nearby NR network. However, in this case, the second UE 602 and the third UE 603 may instead discover the first UE 601, which belongs to the NR network. As with the BS 605, the first UE 601 may transmit SSBs periodically in different transmit directions. The second UE 602 and the third UE 603 may receive the SSBs from the first UE 601 and may synchronize to the NR network based on the received SSBs. Here, the first UE 601 may function as a synchronization source for the second UE 602 and the third UE 603. Thereafter, in some cases, the second UE 602 and the third UE 603 may perform an attach procedure with the first UE 601 to access the NR network.

In some cases, a UE may discover multiple other UEs when searching for the nearby NR network. For example, in some cases, when the fourth UE 604 turns on, the fourth UE 604 may search for the nearby NR network and may discover the first UE 601, the second UE 602, and the third UE 603 belonging to the NR network. The first UE 601, the second UE 602, and the third UE 603 may transmit the SSB periodically in different transmit directions, which may be received by the fourth UE 604. In such cases, when the fourth UE 604 receives multiple SSBs from multiple other UEs, the fourth UE 604 may be configured to select, and synchronize to, the SSB according to a priority associated with the SSB. In some cases, the priority of each SSB may be indicated within each SSB itself. In some cases, the fourth UE 604 may determine priority information associated with each received SSB based on one or more predetermined tables, which define different priorities of synchronization signals (e.g., SSBs) based on, for example, where the synchronization signals are coming from and the type of synchronization technique preferred (e.g., GNSS-based synchronization vs. eNB/gNB-based synchronization).

For example, as shown below in table 1, for GNSS-based synchronization, a synchronization signal received from another UE that is directly synchronized to GNSS may have a highest priority (e.g., P1) while synchronization signals received from UEs that are indirectly synchronized to a gNB/eNB (e.g., BS 605) may have a lower priority (e.g., P5).

TABLE 1

| | GNSS-Based Synchronization Priorities<br>GNSS based synchronization |
|---|---|
| P1 | UE directly synchronized to GNSS |
| P2 | UE indirectly synchronized to the GNSS |
| P3 | eNB/gNB |
| P4 | UE directly synchronized to eNB/gNB |
| P5 | UE indirectly synchronized to gNB/eNB |
| P6 | Remaining UEs |

As shown in table 2, below, for gNB/eNB-based synchronization, a synchronization signal received from another UE that is directly synchronized to a gNB/eNB (e.g., BS 605) may have a highest priority (e.g., P1) while synchronization signals received from UEs that are indirectly synchronized to GNSS may have a lower priority (e.g., P5).

TABLE 2

| | gNB/eNB-Based Synchronization Priorities<br>gNB/eNB based synchronization |
|---|---|
| P1 | UE directly synchronized to gNB/eNB |
| P2 | UE indirectly synchronized to gNB/eNB |
| P3 | GNSS |
| P4 | UE directly synchronized to GNSS |
| P5 | UE indirectly synchronized to GNSS |
| P6 | Remaining UEs |

In certain cases, in response to receiving SSBs from the first UE 601, the second UE 602, and the third UE 603, the fourth UE 604 may evaluate information associated with each SSB to determine which SSB has a highest priority. For example, in some cases, if the V2V system 600 is gNB/eNB-synchronization based, the fourth UE 604 may determine that the SSB received from the first UE 601 has a higher priority (e.g., P1) than the SSB received from the second UE 602 (e.g., P2) and the SSB received from the third UE 603 (e.g., P2), since the first UE 601 is directly synchronized to the BS 605 while the second UE 602 and the third UE 603 are indirectly synchronized to the BS 605 via the first UE 601. Accordingly, in this case, the fourth UE 604 may select the SSB from the first UE 601 having the highest priority for synchronization.

Figure 7:
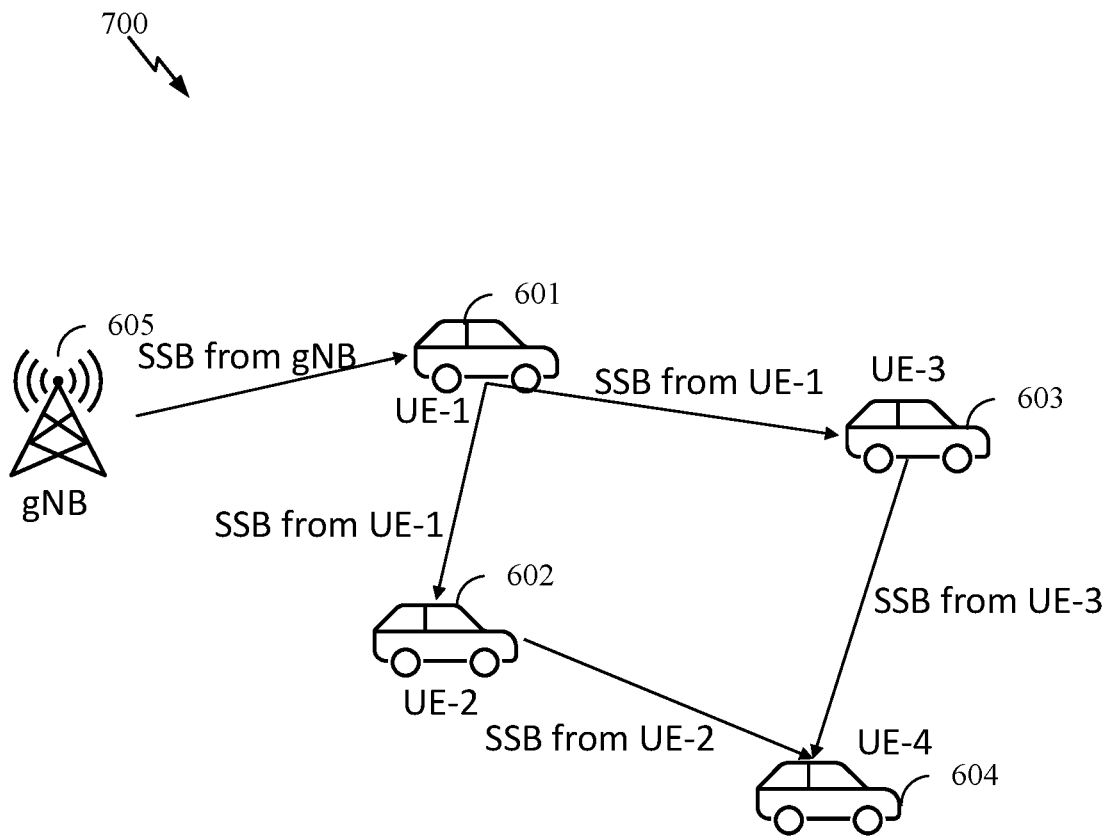
FIG. 7 shows a diagrammatic representation of an example V2V system, in accordance with certain aspects of the present disclosure.

In some cases, however, SSBs received by the fourth UE 604 may have a same priority. In such cases, the fourth UE 604 may not know which SSB to select to use for synchronization. An example of this scenario is illustrated in FIG. 7. For example, FIG. 7 illustrates the V2V system 700, including the first UE 601 (e.g., a vehicle), the second UE 602, the third UE 603, and the fourth UE 604, and the BS 605.

As shown in FIG. 7, the fourth UE 604 may receive synchronization signals (e.g., SSBs) from other UEs in the V2V system 700, such as the second UE 602 and the third UE 603. The fourth UE 604 may then determine a synchronization priority associated with each received SSB (e.g., P1-P6, as illustrated in tables 1 and 2). As noted above, in some cases, the fourth UE 604 may determine the synchronization priority for each received SSB based on an indication included within the SSBs themselves. For example, the fourth UE 604 may determine that the SSB received from the second UE 602 has a synchronization priority of P2 (e.g., assuming gNB/eNB-based synchronization in table 2, above) since the second UE 602 is indirectly synchronized to the BS 605 via the first UE 601. Similarly, the fourth UE 604 may determine that the SSB received from the third UE 603 also has a synchronization priority of P2 since the third UE 603 is also indirectly synchronized to the BS 605 via the first UE 601. As can be seen, the fourth UE 604 may determine that the synchronization priority associated with the SSBs received from the second UE 602 and the third UE 603 is the same since the second UE 602 and the third UE 603 have a same synchronization source (e.g., the first UE 601). However, in such scenarios, because the SSBs from both the second UE 602 and the third UE 603 have the same synchronization priority, the fourth UE 604 may not know whether to select the SSB received from the second UE 602 for synchronization or to select the SSB from the third UE 603 for synchronization.

Accordingly, aspects of the present disclosure provide techniques for assisting a UE (e.g., the fourth UE 604) in selecting an SSB from a set of SSBs (such as the SSB from the second UE 602 or the SSB from the third UE 603) for sidelink synchronization to a network when each SSB in the set of SSBs have a same synchronization priority. For example, in some cases, aspects of the present disclosure provide techniques whereby the fourth UE 604 may select between multiple relay UEs (e.g., the second UE 602 and the third UE 603) with SSBs having a same synchronization priority based on relay capability information associated with the relay UEs from which the SSBs are received and/or synchronization priority associated with the SSBs. In some cases, by taking into account relay capability information when selecting a relay UE to use for synchronizing, the fourth UE 604 may be able to synchronize with a relay UE that provides more reliable relay functionality for the UE (e.g., forwarding of transmissions to and from the fourth UE 604).

More specifically, aspects of present disclosure provide techniques for synchronization of UEs communicating via sidelink channels in a network. For example, in some cases, a remote UE (e.g., the fourth UE 604) communicating via the sidelink channels in a network (e.g., V2V system 600, 700) may select a relay UE (e.g., the second UE 602 or the third UE 603) from multiple relay UEs, based on relay capability information of the relay UE and/or synchronization priority of a synchronization signal received from the relay UE, for synchronization of the remote UE to the network using the synchronization signal received from the selected relay UE.

The UEs communicating via sidelink channels in the network may include the first UE 601, the second UE 602, the third UE 603, and the fourth UE 604, as shown in FIGS. 6-7. As noted above, when performing sidelink communication, all of the UEs may directly communicate with each other and may use each other's synchronization signals for synchronizing to the network. For example, to assist other UEs with synchronization when communicating on the sidelink, each of these UEs may transmit or broadcast their relay capability information to the other UEs. In some cases, each of these UEs may transmit their relay capability information to a B S, such as BS 605. Further, in some cases, each UE may receive the relay capability information of the other UEs directly from the other UEs or may receive the relay capability information of the other UEs from the BS. In some cases, the UEs may process the received relay capability information of the other UEs and may generate a relay capability score of all the other UEs based on the processed relay capability information of the other UEs. The relay capability score may be used to select one of the other UEs for synchronizing to the network, as explained below.

For example, with reference to FIG. 6, when the fourth UE 604 turns on, the fourth UE 604 may search for a nearby NR network (e.g., V2V system 600). The fourth UE 604 may discover the first UE 601, the second UE 602, and the third UE 603 belonging to the NR network. The first UE 601, the second UE 602, and the third UE 603 may transmit a synchronization signal (e.g., an SSB) periodically in different transmit directions. The fourth UE 604 may receive the SSB from one or more of the first UE 601, the second UE 602, or the third UE 603.

Accordingly, when the fourth UE 604 receives the SSBs from the first UE 601, the second UE 602, and/or the third UE 603, the fourth UE 604 may determine whether to prioritize a selection of a SSB from the first UE 601, the second UE 602, and/or the third UE 603, based on a synchronization priority associated with each received SSB from the first UE 601, the second UE 602, and the third UE 603, and/or relay capability information associated with each of the first UE 601, the second UE 602, and the third UE 603. In some cases, the fourth UE 604 may further receive indication, indicating to prioritize using the synchronization priority for selection of the SSB and UE or to prioritize using the relay capability information for selection of the SSB and UE.

For example, when the fourth UE 604 receives an indication to prioritize the selection of the SSB from the first UE 601, the second UE 602, and/or the third UE 603, based on relay capability information over the synchronization priority, the fourth UE 604 may determine a relay capability score corresponding to the first UE 601, the second UE 602, and the third UE 603 based on the relay capability information for each respective UE. For example, the fourth UE 604 may process one or more parameters included within the relay capability information received from the first UE 601, the second UE 602, and the third UE 603. The fourth UE 604 may then generate the relay capability score corresponding to each of the first UE 601, the second UE 602, and the third UE 603 based on the processed parameters for each of the first UE 601, the second UE 602, and the third UE 603.

In some cases, processing the relay capability information of each of the first UE 601, the second UE 602, and the third UE 603 may include applying a particular weight to each parameter of the relay capability information received from the first UE 601, the second UE 602, and the third UE 603. The fourth UE 604 may then calculate the capability score for each of the first UE 601, the second UE 602, and the third UE 603 based on the parameters and applied weights. Thereafter, the fourth UE 604 may select one of the first UE 601, the second UE 602, or the third UE 603 having a highest relay capability score. In one non-limiting example, the fourth UE 604 may select the second UE 602 when the relay capability score of the second UE 602 is greater than the relay capability score of the first UE 601 and the third UE 603. The fourth UE 604 may then use the SSB from the second UE 602 to synchronize to a network.

In some cases, however, the relay capability score for the first UE 601, the second UE 602, and the third UE 603 may be the same and the fourth UE 604 may not know which UE to select. In such cases, when the relay capability score of the first UE 601, the second UE 602, and the third UE 603 is same, the fourth UE 604 may additionally use the synchronization priority associated with each received SSB from the first UE 601, the second UE 602, and/or the third UE 603 to select the SSB of from one of the first UE 601, the second UE 602, or the third UE 603. For example, the fourth UE 604 may process the SSBs received from the first UE 601, the second UE 602, and the third UE 603, to determine the synchronization priority of each SSB. An indication of the synchronization priority may be included within each SSB. In response to determining the synchronization priority of each SSB, the fourth UE 604 may select the SSB of one of the first UE 601, the second UE 602, or the third UE 603 having a highest synchronization priority. For example, in the example illustrated in FIG. 6, if the relay capability score for each of the first UE 601, the second UE 602, and the third UE 603 is the same, the fourth UE 604 may decide to select the first UE 601 based on synchronization priority associated with the SSB of the first UE 601 (e.g., P1) being higher than the SSBs associated with the second UE 602 and the third UE 603 (e.g., P2), assuming a gNB/eNB based synchronization preference. Thereafter, the fourth UE 604 may use the SSB from the first UE 601 to synchronize to the network.

According to aspects, when the fourth UE 604 receives an indication to prioritize the selection of the SSB from the first UE 601, the second UE 602, and/or the third UE 603, based on the synchronization priority associated with each received SSB from the first UE 601, the second UE 602, and the third UE 603 over the relay capability information associated with each of the first UE 601, the second UE 602, and the third UE 603, the fourth UE 604 may determine the synchronization priority of the SSBs received from the first UE 601, the second UE 602, and the third UE 603. For example, the fourth UE 604 may process the SSBs received from the first UE 601, the second UE 602, and the third UE 603, to determine the synchronization priority of each SSB. As noted above, in some cases, an indication of the synchronization priority may be included within each SSB. In response to determining the synchronization priority of each SSB, the fourth UE 604 may select the SSB of the first UE 601, the second UE 602, or the third UE 603 having a highest synchronization priority. For example, in some cases, when using synchronization priority, the fourth UE

604 may decide to select the first UE 601 based on synchronization priority associated with the SSB of the first UE 601 (e.g., P1) being higher than the SSBs associated with the second UE 602 and the third UE 603 (e.g., P2), assuming a gNB/eNB based synchronization preference. Thereafter the fourth UE 604 may use the SSB from the first UE 601 to synchronize to the network.

In some cases, however, the synchronization priority associated with the SSBs of the first UE 601, the second UE 602, and/or the third UE 603 may be the same and the fourth UE 604 may not know which UE to select. In such cases, when the synchronization priority of the SSBs received from the first UE 601, the second UE 602, and the third UE 603 is same, the fourth UE 604 may use the relay capability information associated with each of the first UE 601, the second UE 602, and the third UE 603 to select one UE within the first UE 601, the second UE 602, and the third UE 603, for example, using the techniques described above with respect to generating the relay capability score. For example, the fourth UE 604 may determine a relay capability score corresponding to the first UE 601, the second UE 602, and the third UE 603. The fourth UE 604 may then select one of the first UE 601, the second UE 602, or the third UE 603 having a highest relay capability score. In one non-limiting example, the fourth UE 604 may select the second UE 602 when the relay capability score of the second UE 602 is higher than the relay capability score of the first UE 601 and the third UE 603 (e.g., and the synchronization priority of the SSBs associated with each of the first UE 601, the second UE 602, and the third UE 603 is the same). Thereafter, the fourth UE 604 may use the SSB from the second UE 602 to synchronize to a network.

As noted above, a UE (e.g., a remote UE) may use relay capability information associated with relay UEs to assist with selecting a relay UE for synchronizing to the network. In certain aspects, the relay capability information associated with each relay UE (e.g., the first UE 601, the second UE 602, and the third UE 603 of FIGS. 6-7) may include one or more parameters, as noted above. A remote UE (e.g., the fourth UE 604 of FIGS. 6-7) may assign a weight to each parameter of the relay capability information associated with each relay UE when processing the relay capability information associated with each relay UE. The remote UE may calculate a relay capability score of each relay UE based on weights assigned to each parameter of the relay capability information associated with each UE. The remote UE may select the relay UE having the highest relay capability score for synchronization to the network. For example, once selected, the remote UE may use a synchronization signal received from the selected relay UE to synchronize to the network.

In some cases, the relay capability information associated with each relay UE may include a parameter, such as discontinuous reception (DRX) cycle information associated with each relay UE. In some cases, a relay UE that does not have a DRX cycle may be associated with a higher relay capability than a relay UE that may have a short DRX cycle since the relay UE without the DRX cycle does not have to periodically go to sleep and is able to transmit/relay information on demand with low latency. Similarly, the relay UE with the short DRX cycle may be associated with a better relay capability than a relay UE with a long DRX cycle since the relay UE with the long DRX cycle must periodically go to sleep for relatively long periods of time which can lead to increased latency in transmissions. Accordingly, when calculating the relay capability score, the remote UE may assign more weight to the relay UE with no DRX cycle than to the relay UE with the short DRX cycle. Similarly, when calculating the relay capability score, the remote UE may assign more weight to the relay UE with the short DRX cycle then the relay UE with the long DRX cycle.

In some cases, the relay capability information associated with each relay UE may include a parameter, such as channel state information (CSI) associated with a communication link between each relay UE and a serving BS. The communication link between each relay UE and the serving BS may be a Uu link, such as the Uu communication link between the BS 605 and the first UE 601 in FIGS. 6-7. For example, each relay UE may periodically measure the CSI on the Uu communication link. In some cases, each relay UE may measure the CSI during a radio resource control (RRC) connected mode. In some cases, a relay UE with a good CSI (e.g., above a threshold) may be associated with a higher relay capability than a relay UE with a poor CSI (e.g., below a threshold). For example, the relay UE with the good CSI associated with the Uu communication link may be more reliable for relaying information from the remote UE to the gNB. Accordingly, when calculating the relay capability score, the remote UE may assign more weight to the relay UE with the good CSI than to the relay UE with the poor CSI.

In some cases, the relay capability information associated with each relay UE may include a parameter, such as an indication of an amount of traffic on a communication link between each relay UE and a serving BS. The communication link between each relay UE and the serving BS may be a Uu link. For example, when a relay communicates on the communication link between the relay UE and the serving BS, a throughput associated with the communication link may be affected. For example, when a large amount of traffic is being transmitted on the communication link, the throughput of the communication link may suffer. Accordingly, when there is a large amount of traffic on the communication link associated with a relay UE, that particular relay UE may not be able to effectively relay information from the remote UE to the base station. Accordingly, when calculating the relay capability score, the remote UE may assign more weight to relay UEs with less traffic (e.g., below a threshold) on the communication link between the relay UE and the serving base station than relay UEs having a large amount of traffic (e.g., above a threshold) on the communication link between the relay UE and the serving base station.

In some cases, the relay capability information associated with each relay UE may include a parameter, such as an indication of an amount of traffic on a sidelink communication link between each relay UE and other UEs. The sidelink communication link between each relay UE and other UEs may be PC5. For example, when a relay communicates on the sidelink communication link between the relay UE and other UEs, a throughput associated with the relay UE's sidelink communication link may be affected. For example, when a large amount of traffic is being transmitted on the sidelink communication link associated with a particular relay UE, the throughput of the sidelink communication link may suffer. Accordingly, when there is a large amount of traffic on the sidelink communication link associated with a relay UE, that particular relay UE may not be able to effectively relay information from the remote UE to the base station. Accordingly, when calculating the relay capability score, the remote UE may assign more weight to relay UEs with less traffic (e.g., below a threshold) on the sidelink communication link than relay UEs having a large amount of traffic (e.g., above a threshold) on the side link communication link.

In some cases, the relay capability information associated with each relay UE may include a parameter, such as a channel quality associated with a sidelink communication link of each relay UE. In one non-limiting example, the channel quality associated with the sidelink communication link of each relay UE may be determined using a sidelink discovery reference signal received power (SD-RSRP) associated with RSs received from each relay UE. A relay UE with a higher sidelink communication link channel quality (e.g., higher SD-RSRP (e.g., above a threshold)) may be associated with a higher relay capability than a relay UE with a lower sidelink communication link channel quality (e.g., lower SD-RSRP (e.g., below a threshold)). For example, relay UEs with a higher sidelink communication link channel quality may be more reliable for relaying information from the remote UE to the base station than relay UEs with a lower sidelink communication link channel quality. Accordingly, when calculating the relay capability score, the remote UE may assign more weight to the relay UE with the higher sidelink communication link channel quality than to the relay UE with the lower sidelink communication link channel quality. In another non-limiting example, the channel quality associated with the sidelink communication link of each relay UE may be determined using channel state information reference signal (CSI-RS) measurements associated with each relay UE.

In some cases, the relay capability information associated with each relay UE may include a parameter, such as information about a number of other UEs that each relay UE may connect to. In some cases, a relay UE that may be connected to few other UEs (e.g., below a threshold number of other UEs) may be associated with a higher relay capability than a relay UE that is connected to a larger number other UEs (e.g., above the threshold number of other UEs). For example, a relay UE that is connected to fewer other UE may be more capable of serving the remote UE (e.g., forwarding information from the remote UE to the base station) than a relay UE that is connected to a larger number of other UEs. Accordingly, when calculating the relay capability score, the remote UE may assign more weight to the relay UE that is connected to a less number of other UEs (e.g., 2 other UEs) than the relay UE that is connected to a larger number of other UEs (e.g., 6 other UEs).

In some cases, the relay capability information associated with each relay UE may include a parameter, such as a time source associated with each UE. For example, in some cases, when calculating the relay capability score, the remote UE may assign more weight to a relay UE that has a same time source as of the remote UE in comparison to a relay UE that has a different time source with the remote UE.

Figure 8:
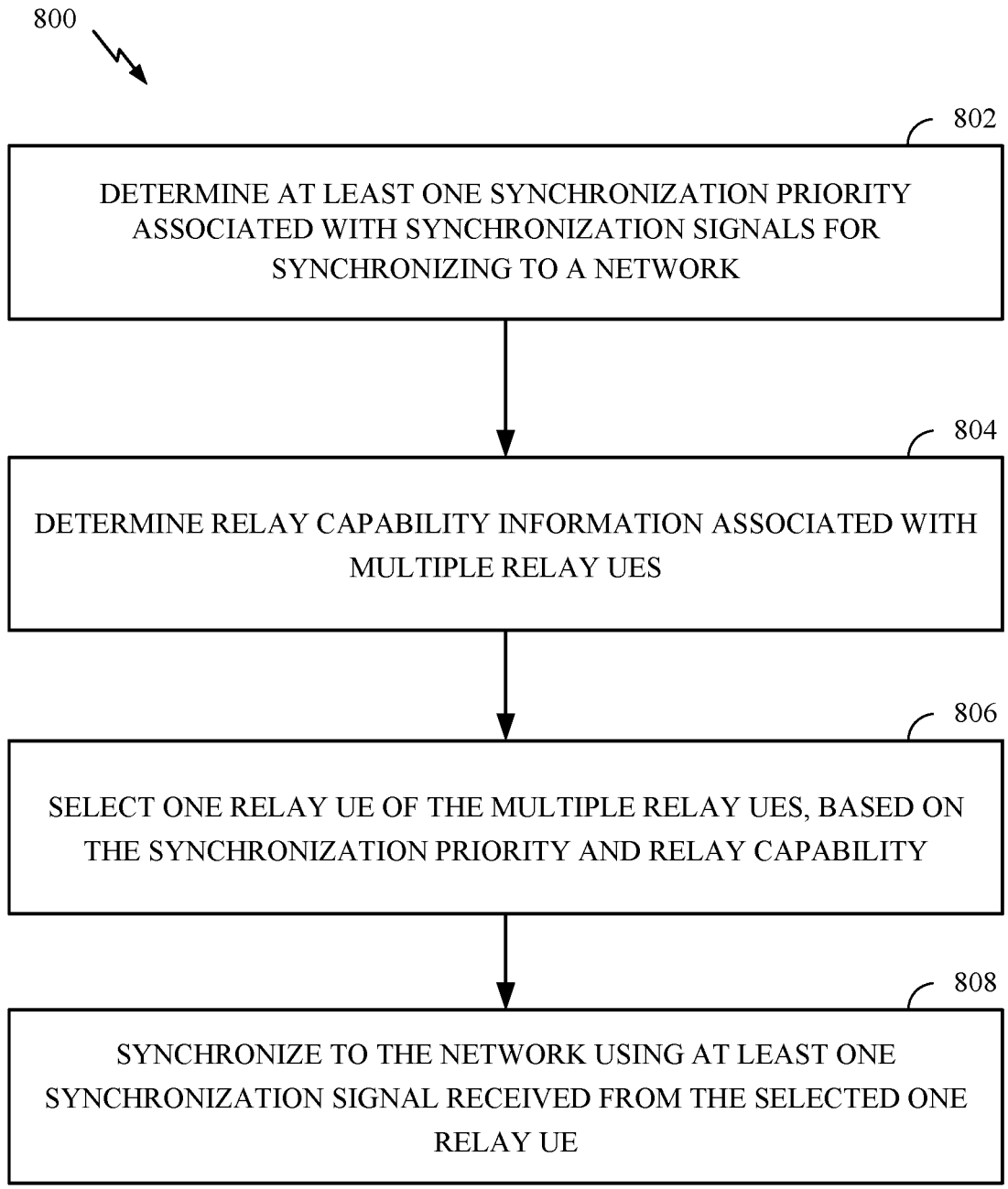
FIG. 8 is a flow diagram illustrating example operations for wireless communication by a remote UE, in accordance with certain aspects of the present disclosure.

FIG. 8 is a flow diagram illustrating example operations 800 for wireless communication, in accordance with certain aspects of the present disclosure. The operations 800 may be performed, for example, by a remote UE. The remote UE may be a UE 120a in a wireless communication network 100 of FIG. 1.

The operations 800 may be implemented as software components that are executed and run on one or more processors (e.g., controller/processor 280 of FIG. 2). Further, the transmission and reception of signals by the remote UE in operations 800 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280, including the sidelink manager 122, 281) obtaining and/or outputting signals.

The operations 800 begin, at 802, by determining at least one synchronization priority associated with synchronization signals for synchronizing to a network.

In some cases, the remote UE may receive the synchronization signals from one or more of multiple relay UEs. In some cases, the synchronization signals comprise global navigation satellite system (GNSS) based synchronization signals. In some cases, the synchronization signals comprise base station-based synchronization signals. In some cases, the synchronization signals include synchronization signal blocks (SSBs).

In some cases, the synchronization signals includes an indication of a synchronization priority corresponding to that received synchronization signal. The synchronization priority indicates a priority for using a corresponding synchronization signal to synchronize to the network. In some cases, the remote UE determines the at least one synchronization priority associated with the synchronization signals for synchronizing to the network based on the indication of the synchronization priority.

At 804, the remote UE determines relay capability information associated with the multiple relay UEs. In some cases, the remote UE may determine the relay capability information associated with the multiple relay UEs from a BS. In some cases, the remote UE receives the relay capability information directly from each of one or more relay UEs of the multiple relay UEs. In some cases, the remote UE may receive the relay capability information from the base station.

In some cases, the relay capability information includes discontinuous reception (DRX) cycle information associated with the one or more relay UEs of the multiple relay UEs. In some cases, the relay capability information includes channel state information (CSI) associated with a communication link between the one or more relay UEs of the multiple relay UEs and a serving BS. In some cases, the CSI associated with the sidelink communication link of the one or more relay UEs of the multiple relay UEs may be based on a sidelink discovery reference signal (RS) received power associated with reference signals received from the one or more relay UEs of the multiple relay UEs. In some cases, the CSI associated with the sidelink communication link of the one or more relay UEs of the multiple relay UEs may be based on CSI-RS measurements associated with the one or more relay UEs of the multiple relay UEs.

In some cases, the relay capability information includes an indication of an amount of traffic on a communication link between the one or more relay UEs of the multiple relay UEs and the serving BS. In some cases, the relay capability information includes an indication of an amount of traffic on a sidelink communication between the one or more relay UEs of the multiple relay UEs and one or more other UEs. In some cases, the relay capability information includes a channel quality associated with a sidelink communication link of the one or more relay UEs of the multiple relay UEs. In some cases, the relay capability information includes a number of other UEs that the one or more relay UEs of the multiple relay UEs connect to. The relay capability information further includes a time source associated with the one or more relay UEs of the multiple relay UEs.

At 806, the remote UE selects one relay UE of the multiple relay UEs based on the synchronization priority and/or the relay capability information.

In some cases, the remote UE receives an indication to prioritize using the relay capability information associated with multiple relay UEs over the synchronization priority associated with synchronization signals from the multiple relay UEs, when selecting the one relay UE of the multiple relay UEs. Accordingly, in such cases, the remote UE may then determine a relay capability score for each of one or more relay UEs of the multiple relay UEs based on the relay capability information associated with the one or more relay UEs of the multiple relay UEs. In some cases, to determine the relay capability score for each of one or more relay UEs of the multiple relay UEs, the remote UE assigns individual weights to parameters included within the relay capability information associated with the one or more relay UEs of the multiple relay UEs. According to aspects, the remote UE may calculate the relay capability score for each of the one or more relay UEs of the multiple relay UEs, based on the assigned individual weights. Thereafter, the remote UE may select the one relay UE of the multiple relay UEs having a highest relay capability score.

In some case, when the one relay UE shares a same relay capability score as another relay UE of the multiple relay UEs, the remote UE may selects the one relay UE of the multiple relay UEs using the synchronization priority associated with the synchronization signals from the one relay UE.

In some cases, the remote UE receives an indication to prioritize using the synchronization priority associated with the synchronization signals from the multiple relay UEs over the relay capability information associated with the multiple relay UEs, when selecting the one relay UE. Accordingly, in such cases, the remote UE may then select the one relay UE based on the synchronization signals from the one relay UE of the multiple relay UEs having a highest synchronization priority.

In some cases, when synchronization signals associated with the one relay UE shares a same synchronization priority as synchronization signals from another relay UE of the multiple relay UEs, the remote UE may selects the one relay UE of the multiple relay UEs using the relay capability information associated with the one relay UE.

At 808, the remote UE synchronizes to the network using at least one synchronization signal received from the selected one relay UE.

Example Broadcast Relay Capability for Sidelink Synchronization

As discussed above, there is a need for techniques to help assist a UE (such as the fourth UE 604 illustrated in FIG. 7) to select an SSB from a relay UE from a set of SSBs from multiple relay UEs (e.g., such as the SSB from the second UE 602 or the SSB from the third UE 603) for sidelink synchronization to a network (e.g., V2V system 600, 700) when each SSB in the set of SSBs have a same synchronization priority.

In accordance with certain aspects of the present disclosure, some UEs may have a relay capability, and operate as relay UEs. Currently, relay UEs do not transmit their relay capability to other UEs, such as a remote UE. Accordingly, there is a need for techniques that enable transmission of the relay capability of the relay UEs to the remote UE.

Accordingly, aspects of present disclosure provide techniques for synchronization of UEs communicating via sidelink channels in a network. For example, in some cases, multiple relay UEs may generate and broadcast relay capability information to a remote UE. The remote UE may receive the transmission from the multiple relay UEs. The remote UE may process the relay capability information of the multiple relay UEs. The remote UE may select a relay UE from the multiple relay UEs based on the processed relay capability information, for synchronization of the remote UE to a network using a synchronization signal received from the first relay UE.

A first relay UE (e.g., the second UE 602 illustrated in FIGS. 6-7) may periodically generate and transmit a sidelink master information bock (MIB-SL). The MIB-SL may include relay capability information of the first relay UE. The BS and/or the remote UE (e.g., the fourth UE 604) may read the MIB-SL to obtain the relay capability information of the first relay UE. The remote UE may compare the relay capability information of the first relay UE with relay capability information of multiple other relay UEs, which may have been previously received by the remote UE. The remote UE may select one relay UE from the multiple relay UEs (including the first relay UE), which may have a highest relay capability score based on the relay capability information, for synchronization of the remote UE to the network using a synchronization signal received from the selected one relay UE.

A first format 900A of a MIB-SL is shown in FIG. 9A. In accordance with aspects, the first format 900A of the MIB-SL may be modified into a second format 900B (as shown in FIG. 9B) to include relay capability information as an additional field. In operation, the first relay UE (e.g., the second UE 602) may broadcast an MIB-SL of the second format 900B. The second format 900B of the MIB-SL may include relay capability information of the first relay UE. The remote UE (e.g., the fourth UE 604) and/or the BS may obtain the relay capability information of the first relay UE by reading the second format 900B of the MIB-SL received from the first relay UE. The remote UE may compare the relay capability information of the first relay UE with relay capability information of multiple other relay UEs, which may have been previously received by the remote UE. The remote UE may select one relay UE from the multiple relay UEs (including the first relay UE), which may have a highest relay capability score based on the relay capability information, for synchronization of the remote UE to the network using a synchronization signal received from the selected one relay UE.

Figure 10A:
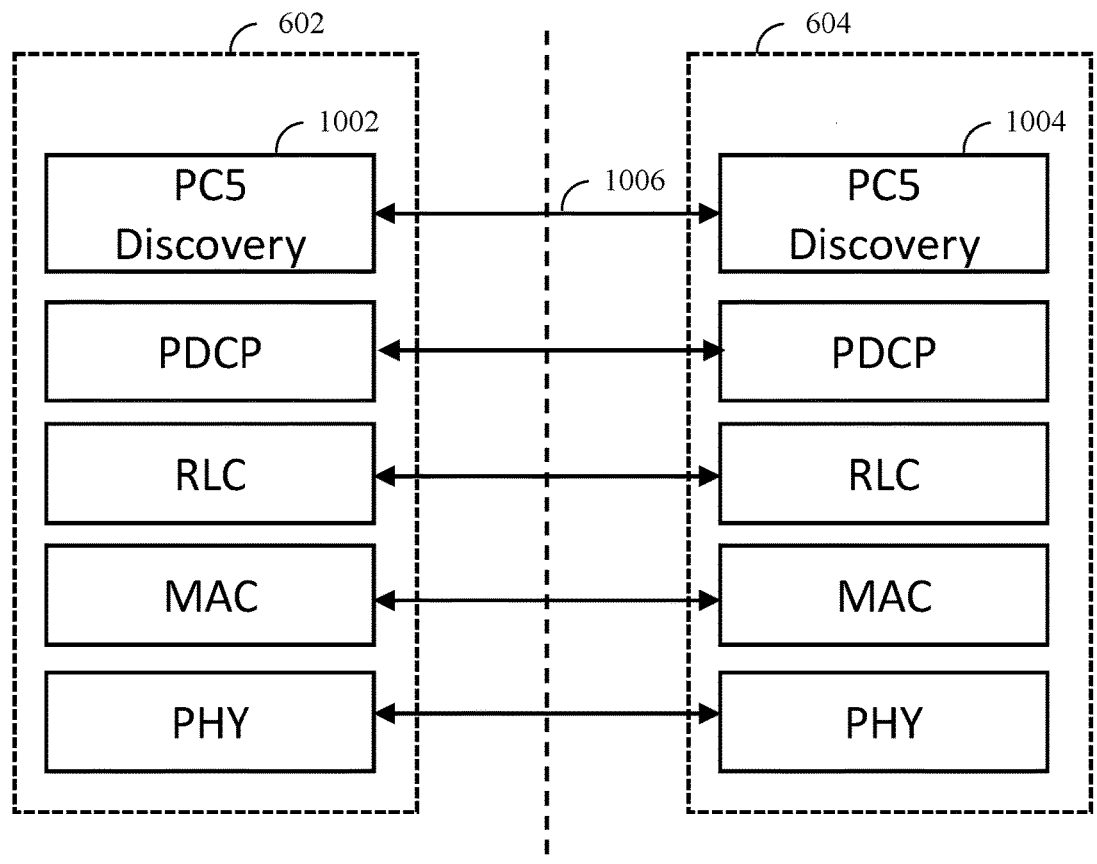
FIG. 10A shows transmission of a discovery message from one UE to another UE over a sidelink PC5 interface, in accordance with certain aspects of the present disclosure.

In some cases, a relay UE, such as the second UE 602, may broadcast a transmission to a remote UE, such as the fourth UE 604, in a network. The transmission from the relay UE (e.g., the second UE) to the remote UE (e.g., the fourth UE 604) may include a discovery message, which may be transmitted via a sidelink PC5 interface 1006. For example, as shown in FIG. 10A, the relay UE (e.g., the second UE 602) may include a protocol stack that includes a PC5 discovery layer 1002. The PC5 discovery layer 1002 may manage the transmission of a discovery message by the relay UE to other UEs, such as the remote UE, on the sidelink. Additionally, as shown in FIG. 10A, the remote UE (e.g., the fourth UE 604) may also include a PC5 discovery layer 1004, which manages reception of discovery messages from other UEs, such as the relay UE, on the sidelink. In some cases, the discovery message transmitted by the relay UE may include relay capability information of the relay UE. The remote UE may receive the discovery message via the sidelink PC5 interface. The remote UE (e.g., the fourth UE 604) may compare the relay capability information of the relay UE (e.g., the second UE 602) with relay capability information of multiple other relay UEs, which may have been previously received by the remote UE. The remote UE may select one relay UE from the multiple relay UEs (including the second UE 602), which may have a highest relay capability score based on the relay capability information, for synchronization of the remote UE to the network using a synchronization signal received from the selected one relay UE.

Figure 10B:
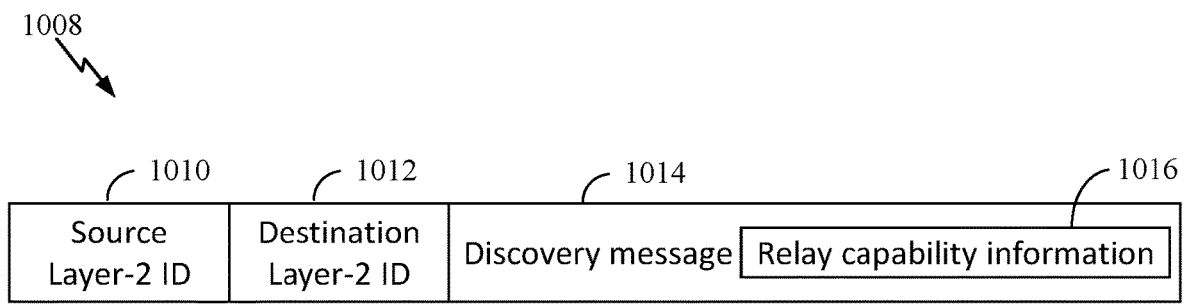
FIG. 10B shows a media access control (MAC) frame including relay capability information, in accordance with certain aspects of the present disclosure.

In some cases, the discovery message may be broadcast by the relay UE (e.g., the second UE 602) in a media access control (MAC) frame 1008, as depicted in FIG. 10B. As shown, the MAC frame 1008 may include a source layer-2 identifier (ID) field 1010, a destination layer-2 ID field 1012, and a discovery message field 1014. Further as shown, the discovery message field 1014 may include relay capability information 1016 of the relay UE (e.g., the second UE 602). The remote UE may receive MAC frame 1008 and obtain the relay capability information of the relay UE. The remote UE may then compare the relay capability information of the first relay UE with relay capability information of multiple other relay UEs, which may have been previously received by the remote UE. The remote UE (e.g., the fourth UE 604) may select one relay UE from the multiple relay UEs (including the second UE 602), which may have a highest relay capability score based on the relay capability information, for synchronization of the remote UE to the network using a synchronization signal received from the selected one relay UE.

Figure 11:
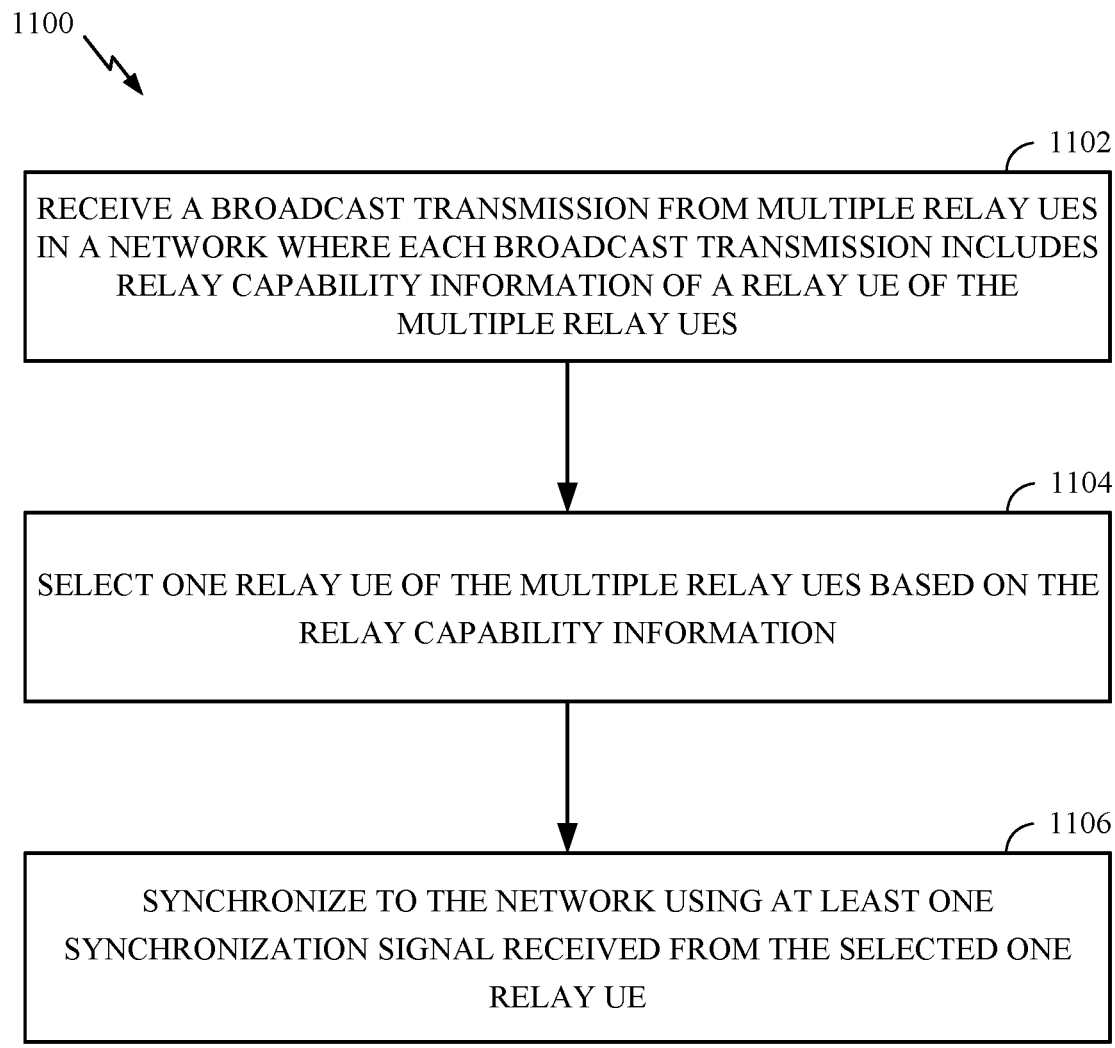
FIG. 11 is a flow diagram illustrating example operations for wireless communication by a remote UE, in accordance with certain aspects of the present disclosure.

FIG. 11 is a flow diagram illustrating example operations 1100 for wireless communication. In some cases, operations 1100 may be performed, by a remote UE (e.g., the UE 120a in the wireless communication network 100 of FIG. 1) The operations 1100 may be implemented as software components that are executed and run on one or more processors (e.g., controller/processor 280 of FIG. 2). Further, the transmission and reception of signals by the remote UE in operations 1100 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280, including the sidelink manager 122, 281) obtaining and/or outputting signals.

Operations 1100 begin, at 1102, by receiving a broadcast transmission from multiple relay UEs in a network. Each broadcast transmission includes relay capability information of a relay UE of the multiple relay UEs.

The transmission from each relay UE includes a MIB-SL. The MIB-SL includes the relay capability information of the relay UE of the multiple relay UEs. In another non-limiting example, the transmission from each relay UE includes a discovery message. The discover message includes the relay capability information of the relay UE of the multiple relay UEs. The discovery message is received over a sidelink PC5 interface. In another non-limiting example, the transmission from each relay UE includes a media access control (MAC) frame. The MAC frame includes the relay capability information of the relay UE of the multiple relay UEs.

The relay capability information of the relay UE of the multiple relay UEs includes parameters indicating information for prioritizing synchronization signals received from the multiple relay UEs.

The relay capability information includes discontinuous reception (DRX) cycle information associated with the one or more relay UEs of the multiple relay UEs. The relay capability information further includes channel state information (CSI) associated with a communication link between the one or more relay UEs of the multiple relay UEs and a serving BS. In one non-limiting example, the CSI associated with the sidelink communication link of the one or more relay UEs of the multiple relay UEs is determined based on a sidelink discovery reference signal (RS) received power associated with reference signals received from the one or more relay UEs of the multiple relay UEs. In another non-limiting example, the CSI associated with the sidelink communication link of the one or more relay UEs of the multiple relay UEs is determined based on CSI-RS measurements associated with the one or more relay UEs of the multiple relay UEs.

The relay capability information further includes an indication of an amount of traffic on a communication link between the one or more relay UEs of the multiple relay UEs and the serving BS. The relay capability information further includes an indication of an amount of traffic on a sidelink communication between the one or more relay UEs of the multiple relay UEs and one or more other UEs. The relay capability information further includes a channel quality associated with a sidelink communication link of the one or more relay UEs of the multiple relay UEs. The relay capability information further includes a number of other UEs that the one or more relay UEs of the multiple relay UEs connect to. The relay capability information further includes a time source associated with the one or more relay UEs of the multiple relay UEs.

At 1104, the remote UE selects one relay UE of the multiple relay UEs based on the relay capability information. When the relay capability information includes the parameters indicating the information for prioritizing the synchronization signals received from the multiple relay UEs, then the one relay UE is selected based on priority information associated with its synchronization signal.

At 1106, the remote UE synchronizes to the network using at least one synchronization signal received from the selected one relay UE.

Figure 12:
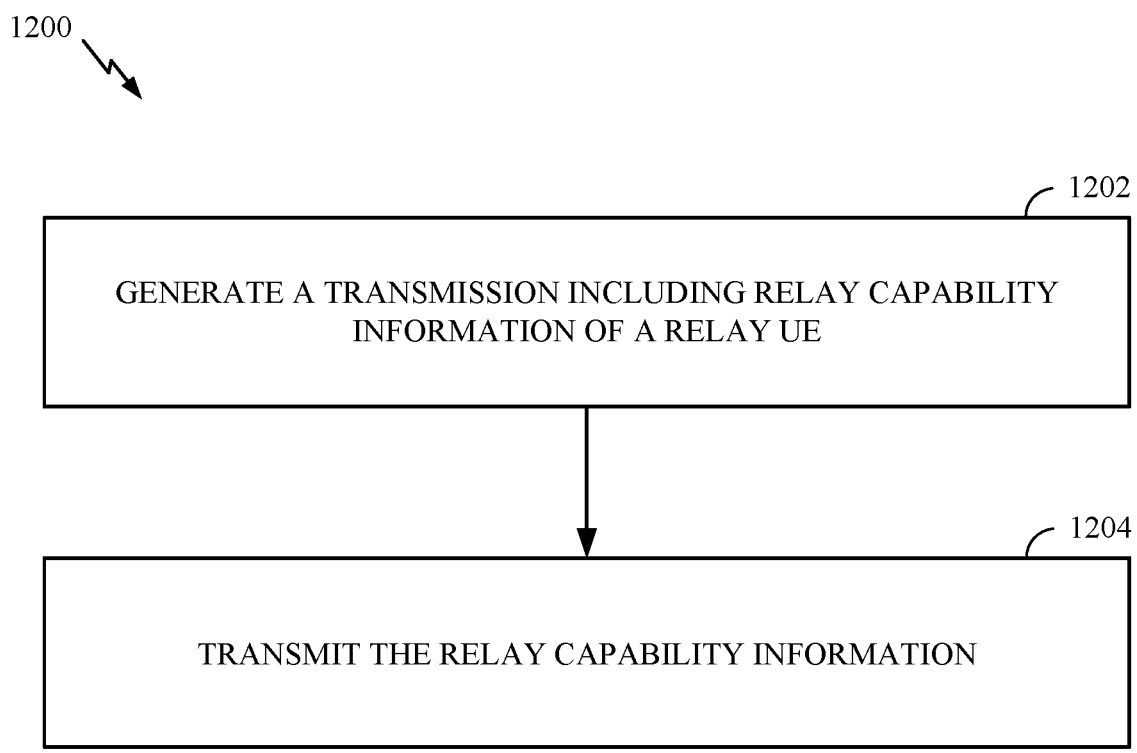
FIG. 12 is a flow diagram illustrating example operations for wireless communication by a relay UE, in accordance with certain aspects of the present disclosure.

FIG. 12 is a flow diagram illustrating example operations 1200 for wireless communication by a relay UE of multiple relay UEs. For example, operations 1200 may be performed, by a relay UE (e.g., any one of the UEs 120 in the wireless communication network 100 of FIG. 1). The operations 1200 may be considered complementary to the operations 1100 of FIG. 11. The operations 1200 may be implemented as software components that are executed and run on one or more processors (e.g., controller/processor 280 of FIG. 2). Further, the transmission and reception of signals by the relay UE in operations 1200 may be enabled, for example, by one or more antennas (e.g., antennas 252 of FIG. 2). In certain aspects, the transmission and/or reception of signals by the relay UE may be implemented via a bus interface of one or more processors (e.g., controller/processor 280, including the sidelink manager 122, 281) obtaining and/or outputting signals.

Operations 1200 begin, at 1202, by generating a transmission including relay capability information of the relay UE.

At 1204, the relay UE broadcasts transmission including the relay capability information to a remote UE and/or a BS. The transmission includes a MIB-SL transmitted on a slidelink channel. The MIB-SL includes the relay capability information of the relay UE. In another non-limiting example, the transmission includes a discovery message. The discovery message includes the relay capability information of the relay UE. The discovery message is received over a sidelink PC5 interface. In another non-limiting example, the transmission includes a MAC frame. The MAC frame includes the relay capability information of the relay UE.

The relay capability information of the relay UE of the multiple relay UEs includes parameters indicating information for prioritizing synchronization signals received from the multiple relay UEs.

The relay capability information includes DRX cycle information associated with the one or more relay UEs of the multiple relay UEs. The relay capability information further includes associated with a communication link between the one or more relay UEs of the multiple relay UEs and a serving BS. In one non-limiting example, the CSI associated with the sidelink communication link of the one or more relay UEs of the multiple relay UEs is determined based on a sidelink discovery RS received power associated with reference signals received from the one or more relay UEs of the multiple relay UEs. In another non-limiting example, the CSI associated with the sidelink communication link of the one or more relay UEs of the multiple relay UEs is determined based on CSI-RS measurements associated with the one or more relay UEs of the multiple relay UEs.

The relay capability information further includes an indication of an amount of traffic on a communication link between the one or more relay UEs of the multiple relay UEs and the serving BS. The relay capability information further includes an indication of an amount of traffic on a sidelink communication between the one or more relay UEs of the multiple relay UEs and one or more other UEs. The relay capability information further includes a channel quality associated with a sidelink communication link of the one or more relay UEs of the multiple relay UEs. The relay capability information further includes a number of other UEs that the one or more relay UEs of the multiple relay UEs connect to. The relay capability information further includes a time source associated with the one or more relay UEs of the multiple relay UEs.

Figure 13:
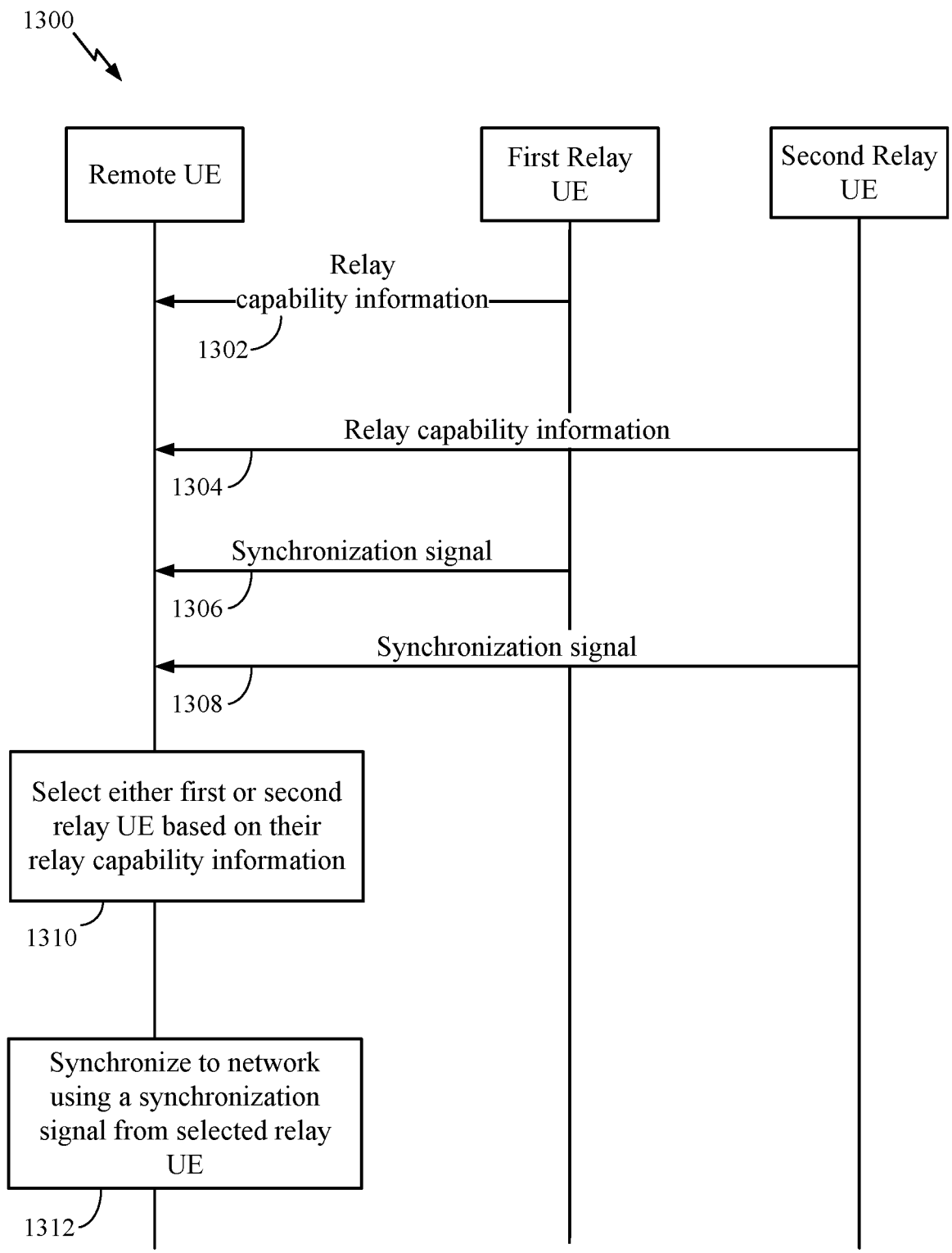
FIG. 13 is a call flow diagram illustrating example signaling between a remote UE and relay UEs, in accordance with aspects of the present disclosure.

FIG. 13 is a call flow diagram 1300 illustrating example signaling between a remote UE, a first relay UE, and a second relay UE. At 1302, the first relay UE may broadcast its relay capability information. The remote UE may generate a relay capability score of the first relay UE using the relay capability information of the first relay UE. At 1304, the second relay UE may broadcast its relay capability information. The remote UE may generate a relay capability score of the second relay UE using the relay capability information of the second relay UE. At 1306, the first relay UE may transmit a synchronization signal received by the remote UE. At 1308, the second relay UE may transmit a synchronization signal received by the remote UE. At 1310, the remote UE may select one relay UE from the first relay UE and the second relay UE, which has a higher relay capability score, which is determined based on their relay capability information. At 1312, the remote UE may synchronize to a network using the synchronization signal received from the selected one relay UE.

Example Relay Capability Configuration for Sidelink Synchronization

As discussed above, there is a need for techniques to help assist a UE (such as the fourth UE 604 illustrated in FIG. 7) to select an SSB from a relay UE from a set of SSBs from multiple relay UEs (e.g., such as the SSB from the second UE 602 or the SSB from the third UE 603) for sidelink synchronization to a network (e.g., V2V system 600, 700) when each SSB in the set of SSBs have a same synchronization priority.

In accordance with certain aspects of the present disclosure, some UEs may have a relay capability, and operate as relay UEs. In some cases, other UEs, such as remote UEs, may be able to synchronize and communicate with the network via one or more of the relay UEs. However, it is currently unspecified regarding which relay UE to use for sidelink synchronization to a network when SSB signals from two or more relay UEs have a same priority of SSB signals. In some cases, a remote UE may select a relay UE from multiple relay UEs based on a relay capability configuration. As described herein, a remote UE can derive a relay capability based on all or a subset of the information available associated with a remote UE, and a priority of relay capability.

In some cases, a BS may determine a relay capability configuration for selecting one relay UE of multiple relay UEs for synchronizing to a network. The BS may transmit the relay capability configuration to a remote UE, via a radio resource control (RRC) message. The remote UE may determine the relay capability configuration from the RRC message. The remote UE may select the one relay UE of the multiple relay UEs based on the relay capability configuration. The remote UE may synchronize to the network using a synchronization signal received from the selected one relay UE.

In some cases, the BS may determine multiple relay capability configurations. The BS may transmit the multiple relay capability configurations to the remote UE. The remote UE may receive the multiple relay capability configurations via layer 1 and/or layer 2 signaling. The BS may further transmit to the remote UE an indication of one relay capability configuration of the multiple relay capability configurations to use for selecting one relay UE of multiple relay UEs for synchronizing to a network. The remote UE may select the one relay capability configuration to use from the multiple relay capability configurations based on the received indication. The remote UE may select the one relay UE of the multiple relay UEs based on the selected relay capability configuration. The remote UE may synchronize to the network using a synchronization signal received from the selected one relay UE.

In some cases, the remote UE may select one relay capability configuration from the multiple relay capability configurations (e.g., without signaling from the BS) to use for selecting one relay UE of multiple relay UEs for synchronizing to a network. The remote UE may select the one relay UE of the multiple relay UEs based on the selected relay capability configuration. The remote UE may synchronize to the network using a synchronization signal received from the selected one relay UE.

In some embodiments, relay UEs may be associated with one or more relay capabilities, which may be defined by one or more parameters. A first parameter associated with each relay UE may be discontinuous reception (DRX) cycle information. A relay UE that does not have a DRX cycle may have a better relay capability than a relay UE that has a short DRX cycle. Further, in some cases, the relay UE with the short DRX cycle may have a better relay capability than a relay UE with a long DRX cycle.

A second parameter associated with relay UEs may be channel state information (CSI) associated with a communication link between a relay UE and a serving BS. The communication link between the relay UE and the serving BS may be a Uu link. The relay UE may periodically measure the CSI associated with the Uu link. In some cases, the relay UE may measure the CSI during a radio resource control (RRC) connected mode. A relay UE with a good CSI may have a better relay capability than a relay UE with a bad CSI.

A third parameter associated with the relay UEs may be an indication of an amount of traffic on a communication link between a relay UE and a serving BS. The communication link between the relay UE and the serving BS may be a Uu link. When the relay UE forwards a message to the BS on the Uu link, a throughput of the relay UE may be reduced, which may affect the relay capability of the relay UE.

A fourth parameter associated with each relay UE may be an indication of an amount of traffic on a sidelink communication link between a relay UE and other UEs. The sidelink communication link between the relay UE and other UEs may be associated with a PC5 interface. When the relay UE forwards a message on the sidelink communication link, a throughput of the relay UE may be reduced, which may affect the relay capability of the relay UE.

A fifth parameter associated with relay UEs may be a channel quality associated with a sidelink communication link of each relay UE. In one non-limiting example, the channel quality associated with the sidelink communication link of each relay UE may be determined using a sidelink discovery reference signal received power (SD-RSRP) associated with RSs received from each relay UE. A relay UE with a higher SD-RSRP may have a better relay capability than a relay UE with a lower SD-RSRP. In another non-limiting example, the channel quality associated with the sidelink communication link of each relay UE may be determined using channel state information reference signal (CSI-RS) measurements associated with each relay UE.

A sixth parameter associated with each relay UE may be information about a number of other UEs that each relay UE connects to. A relay UE that is connected to fewer other UEs may have a better relay capability than a relay UE that is connected to more other UEs.

A seventh parameter associated with each relay UE may be a time source associated with each UE. The remote UE may assign more weight to a relay UE that has a same time source as of the remote UE in comparison to a relay UE that has a different time source with the remote UE.

As noted above, in some cases, a remote UE may receive a RRC message from a BS. The remote UE may determine a relay capability configuration for selecting one relay UE of multiple relay UEs for synchronizing to a network based on the RRC message. The relay capability configuration may provide an indication of which capabilities (or parameters) associated with multiple relay UEs to consider when selecting the one relay UE of the multiple relay UEs for synchronizing to the network. In one non-limiting example, the relay capability configuration may indicate to only consider a first parameter (e.g., DRX cycle information). In such a case, when the remote UE (e.g., the fourth UE 604 illustrated in FIGS. 6-7) has to select one relay UE from a group of two relay UEs, such as a first relay UE and a second relay UE (e.g., the second UE 602 and the third UE 603 illustrated in FIGS. 6-7), the remote UE may determine information associated with the first parameter of the first relay UE and the second relay UE. The remote UE may evaluate the information associated with the first parameter of the first relay UE and the second relay UE. The remote UE may select a relay UE from the group of the first relay UE and the second relay UE, which has a higher relay capability, based on the evaluation of the information associated with the first parameter of the first relay UE and the second relay UE. The remote UE may synchronize to the network using a synchronization signal received from the selected relay UE.

In some cases, the remote UE may receive a RRC message from a BS. The RRC message indicates a relay capability configuration for selecting one relay UE of multiple relay UEs for synchronizing to a network. The relay capability configuration may provide an indication of which of synchronization priority or relay capability to prioritize when selecting the one relay UE of the multiple relay UEs for synchronizing to the network.

In one non-limiting example, the relay capability configuration may indicate to prioritize the synchronization priority over the relay capability. In such a case, when the remote UE has to select one relay UE from a group of two relay UEs (for example, a first relay UE and a second relay UE), the remote UE may determine the synchronization priority associated with a synchronization signal received from the first relay UE and the second relay UE. In some cases, the synchronization signal may include information indicating the synchronization priority of the synchronization signal. The remote UE may then select a relay UE from the group of the first relay UE and the second relay UE, which transmitted the synchronization signal of a higher synchronization priority to the remote UE. The remote UE may synchronize to the network using the synchronization signal received from the selected relay UE.

In another non-limiting example, the relay capability configuration may indicate to prioritize the relay capability over the synchronization priority. In such a case, when the remote UE has to select one relay UE from a group of two relay UEs (for example, a first relay UE and a second relay UE), the remote UE may determine a relay capability score of the first relay UE and the second relay UE. The relay capability score of each relay UE may be determined based on evaluation of all parameters associated with each relay UE. The remote UE may then select a relay UE from the group of the first relay UE and the second relay UE, which may have a higher relay capability score. The remote UE may synchronize to the network using the synchronization signal received from the selected relay UE.

Figure 14:
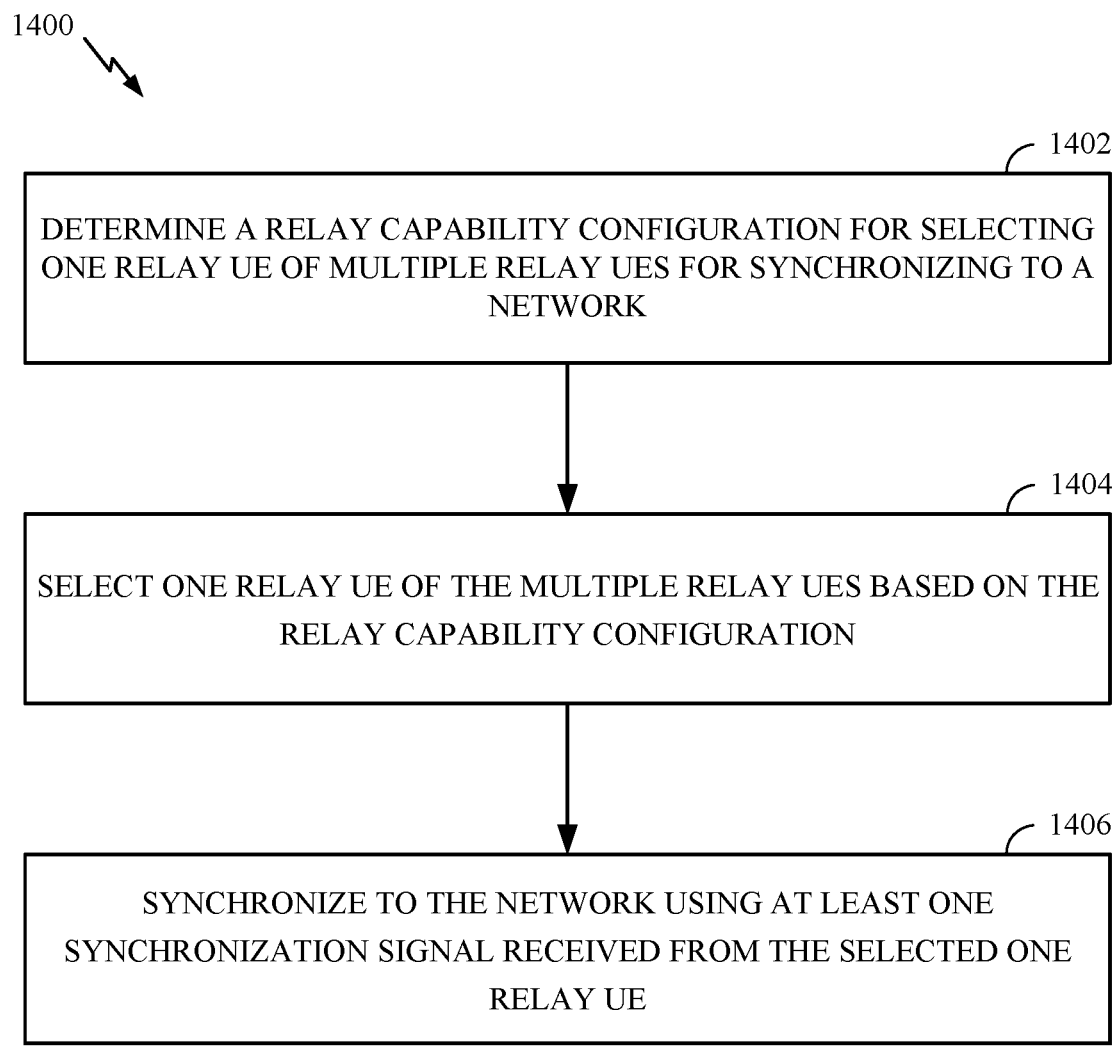
FIG. 14 is a flow diagram illustrating example operations for wireless communication by a remote UE, in accordance with certain aspects of the present disclosure.

FIG. 14 is a flow diagram illustrating example operations 1400 for wireless communication. In one non-limiting example, operations 1400 may be performed, by a remote UE (e.g., the UE 120 in the wireless communication network 100 of FIG. 1). The operations 1400 may be implemented as software components that are executed and run on one or more processors (e.g., controller/processor 280 of FIG. 2). Further, the transmission and reception of signals by the remote UE in operations 1400 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280, including the sidelink manager 122, 281) obtaining and/or outputting signals.

Operations 1400 begin, at 1402, by determining a relay capability configuration for selecting one relay UE of multiple relay UEs for synchronizing to a network.

The remote UE receives a RRC message from a BS. The RRC message includes the relay capability configuration for selecting the one relay UE of the multiple relay UEs. The remote UE determines the relay capability configuration to use by reading the RRC message.

The remote UE receives multiple relay capability configurations from the BS, via layer 1 or layer 2 signaling. The remote UE further receives an indication of one relay capability configuration of the multiple relay capability configurations to use, from the BS. The remote UE selects the relay capability configuration to use from the multiple relay capability configurations based on the received indication. In some cases, the remote UE selects the relay capability configuration to use from the multiple relay capability configurations without any signaling from the BS indicating which relay capability configuration to select.

The relay capability configuration provides an indication of which capabilities associated with the multiple relay UEs to consider when selecting the one relay UE to synchronize to the network with. In another non-limiting example, the relay capability configuration provides an indication of which of synchronization priority or relay capability to prioritize when selecting the one relay UE to synchronize to the network with.

At 1404, the remote UE selects the one relay UE of the multiple relay UEs based on the relay capability configuration.

At 1406, the remote UE synchronizes to the network using at least one synchronization signal received from the selected one relay UE.

Figure 15:
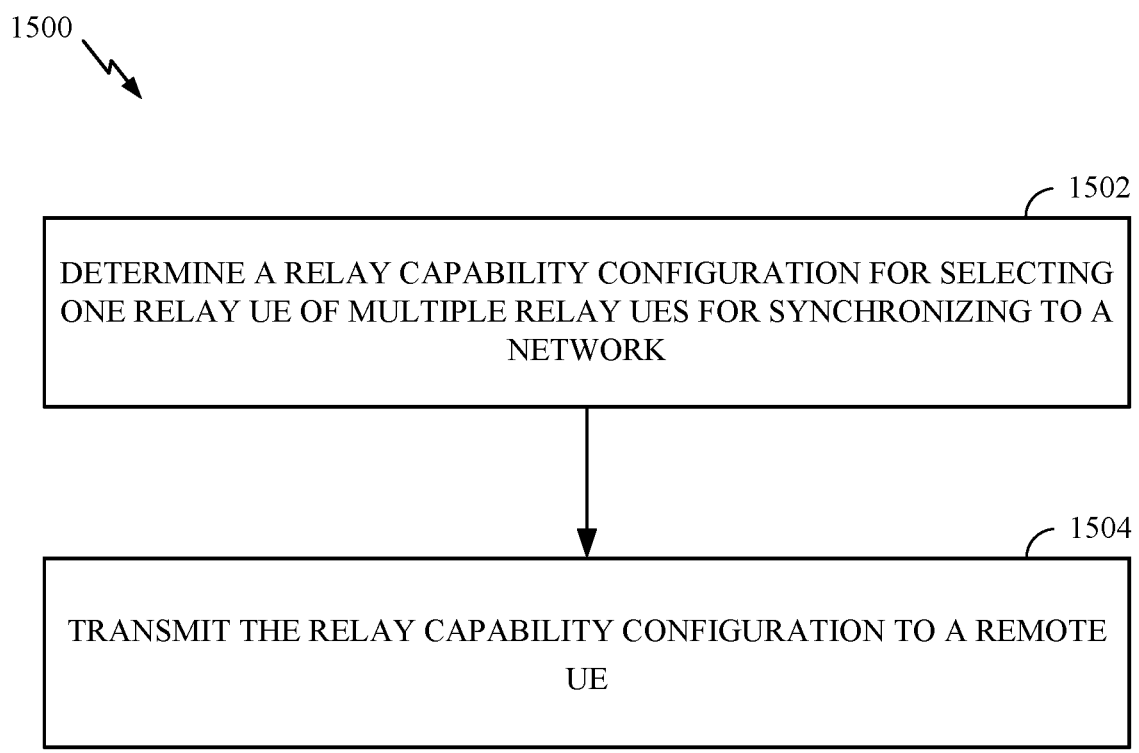
FIG. 15 is a flow diagram illustrating example operations for wireless communication by a BS, in accordance with certain aspects of the present disclosure.

FIG. 15 is a flow diagram illustrating example operations 1500 for wireless communication by a BS. For example, operations 1500 may be performed, by a BS (e.g., the BS 110a in the wireless communication network 100 of FIG. 1). The operations 1500 may be considered complementary to the operations 1400 of FIG. 14. The operations 1500 may be implemented as software components that are executed and run on one or more processors (e.g., controller/processor 240 of FIG. 2). Further, the transmission and reception of signals by the BS in operations 1500 may be enabled, for example, by one or more antennas (e.g., antennas 234 of FIG. 2). In certain aspects, the transmission and/or reception of signals by the BS may be implemented via a bus interface of one or more processors (e.g., controller/processor 240, including the sidelink manager 241) obtaining and/or outputting signals.

Operations 1500 begin, at 1502, by determining a relay capability configuration for selecting one relay UE of multiple relay UEs for synchronizing to a network.

The relay capability configuration provides an indication of which capabilities associated with the multiple relay UEs to consider when selecting the one relay UE to synchronize to the network with. In another non-limiting example, the relay capability configuration provides an indication of which of synchronization priority or relay capability to prioritize when selecting the one relay UE to synchronize to the network with.

At 1504, the BS transmits the relay capability configuration to a remote UE in a RRC message. The remote UE selects the one relay UE of the multiple relay UEs based on the relay capability configuration. The remote UE synchronizes to the network using at least one synchronization signal received from the selected one relay UE.

In some embodiments, the BS determines and then transmits multiple relay capability configurations to the remote UE via layer 1 or layer 2 signaling. The BS further transmits to the remote UE, an indication of one relay capability configuration of the multiple relay capability configurations to use for selecting the one relay UE to synchronize to the network with. The remote UE selects the relay capability configuration to use from the multiple relay capability configurations based on the received indication. The remote UE selects the one relay UE of the multiple relay UEs based on the selected relay capability configuration. The remote UE synchronizes to the network using a synchronization signal received from the selected one relay UE.

Figure 16:
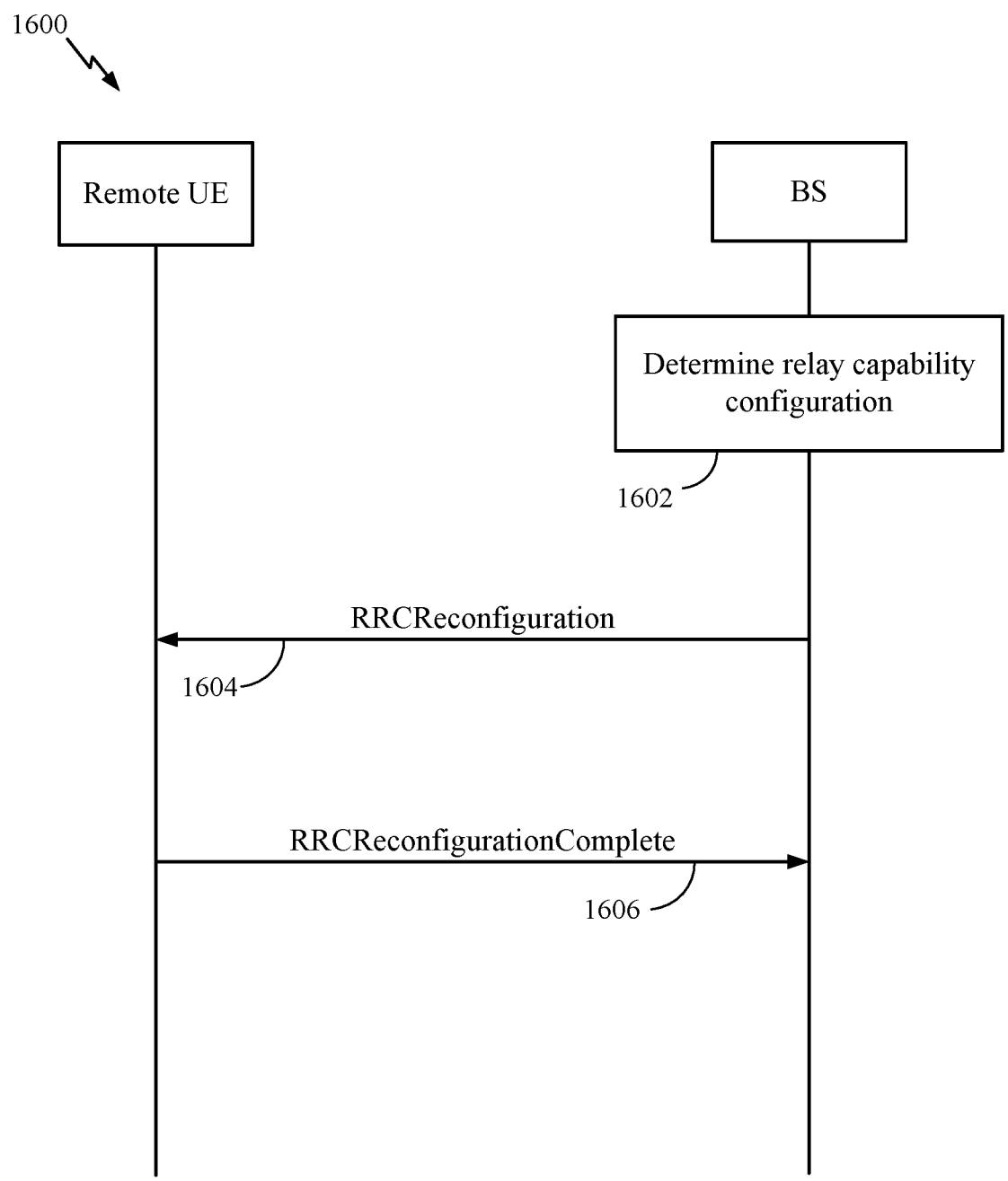
FIG. 16 is a call flow diagram illustrating example signaling between a remote UE and a BS, in accordance with aspects of the present disclosure.

FIG. 16 is a call flow diagram 1600 illustrating example signaling between a remote UE and a BS. At 1602, the BS may determine a relay capability configuration for selecting one relay UE of multiple relay UEs for synchronizing to a network. At 1604, the BS may send RRCReconfiguration message (for example, the relay capability configuration via a RRC message) to the remote UE. On receiving the relay capability configuration via the RRC message, at 1606, the remote UE may send RRCReconfigurationComplete message (for example, an acknowledgement of receiving the relay capability configuration) to the BS.

Example Wireless Communication Devices

Figure 17:
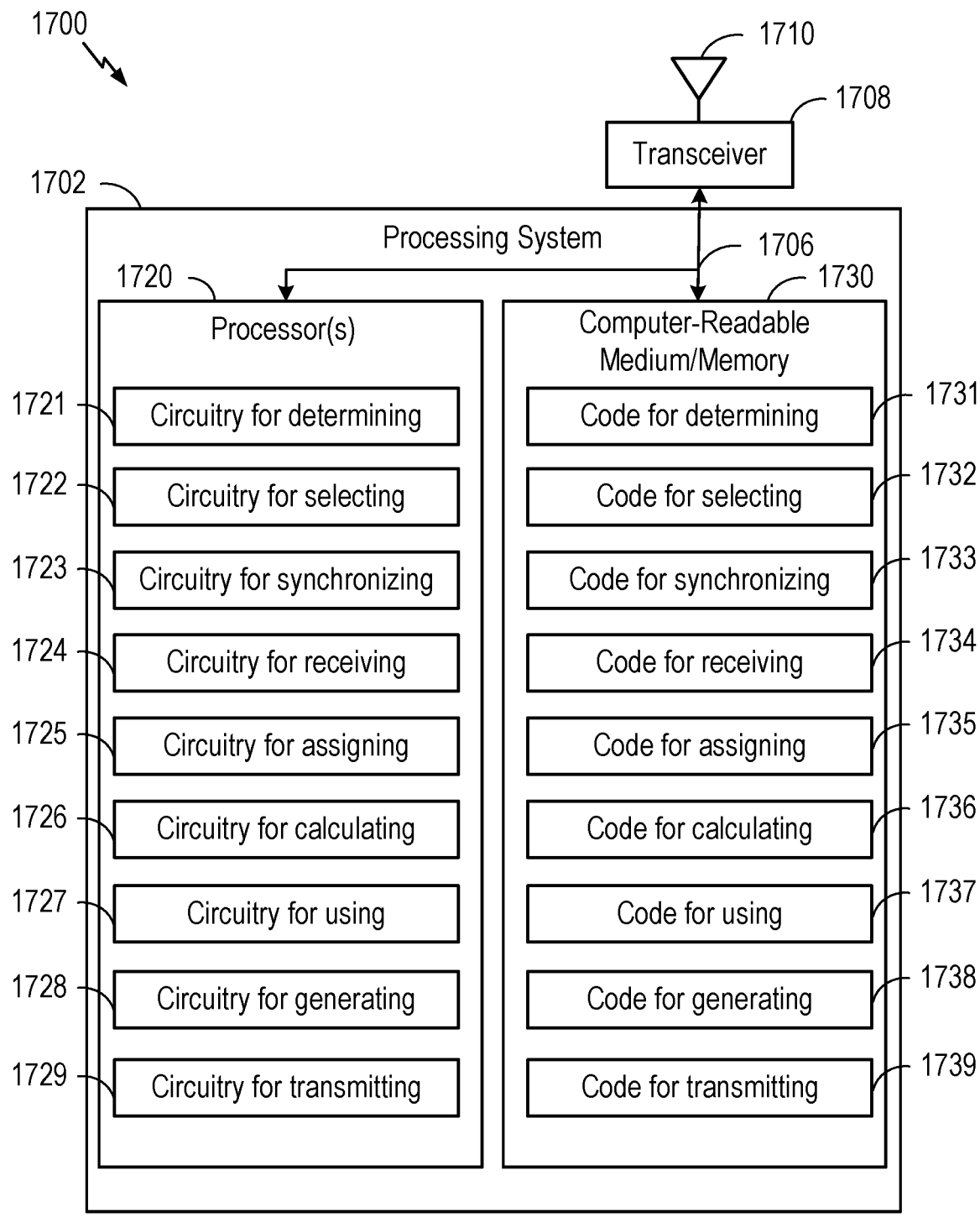
FIGS. 17-18 depict aspects of example communications devices.

FIG. 17 depicts an example communications device 1700 that includes various components operable, configured, or adapted to perform operations for the techniques disclosed herein, such as the operations depicted and described with respect to FIGS. 8, 11, 12, 13, 14, and 16. In some examples, communication device 1700 may be a user equipment, such as UE 120a as described with respect to FIGS. 1 and 2.

Communications device 1700 includes a processing system 1702 coupled to a transceiver 1708 (e.g., a transmitter and/or a receiver). Transceiver 1708 is configured to transmit (or send) and receive signals for the communications device 1700 via an antenna 1710, such as the various signals as described herein. Processing system 1702 may be configured to perform processing functions for communications device 1700, including processing signals received and/or to be transmitted by communications device 1700.

Processing system 1702 includes one or more processors 1720 coupled to a computer-readable medium/memory 1730 via a bus 1706. In certain aspects, computer-readable medium/memory 1730 is configured to store instructions (e.g., computer-executable code) that when executed by the one or more processors 1720, cause the one or more processors 1720 to perform the operations illustrated in FIGS. 8, 11, 12, 13, 14, and 16, or other operations for performing the various techniques discussed herein for sidelink synchronization in a network.

In the depicted example, computer-readable medium/memory 1730 stores code 1731 for determining, code 1732 for selecting, code 1733 for synchronizing, code 1734 for receiving, code 1735 for assigning, code 1736 for calculating, code 1737 for using, code 1738 for generating, and code 1739 for transmitting.

In the depicted example, the one or more processors 1720 include circuitry configured to implement the code stored in the computer-readable medium/memory 1730, including circuitry 1721 for determining, circuitry 1722 for selecting, circuitry 1723 for synchronizing, circuitry 1724 for receiving, circuitry 1725 for assigning, circuitry 1726 for calculating, circuitry 1727 for using, circuitry 1728 for generating, and circuitry 1729 for transmitting.

Various components of communications device 1700 may provide means for performing the methods described herein, including with respect to FIGS. 8, 11, 12, 13, 14, and 16.

In some examples, means for transmitting or sending (or means for outputting for transmission) may include the transceivers 254 and/or antenna(s) 252 of the UE 120a illustrated in FIG. 2 and/or transceiver 1708 and antenna 1710 of the communication device 1700 in FIG. 17.

In some examples, means for receiving (or means for obtaining) may include the transceivers 254 and/or antenna(s) 252 of the UE 120a illustrated in FIG. 2 and/or transceiver 1708 and antenna 1710 of the communication device 1700 in FIG. 17.

In some examples, means for determining, means for selecting, means for synchronizing, means for assigning, means for calculating, means for using, and means for generating may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including sidelink manager 281).

Notably, FIG. 17 is just one example, and many other examples and configurations of communication device 1700 are possible.

Figure 18:
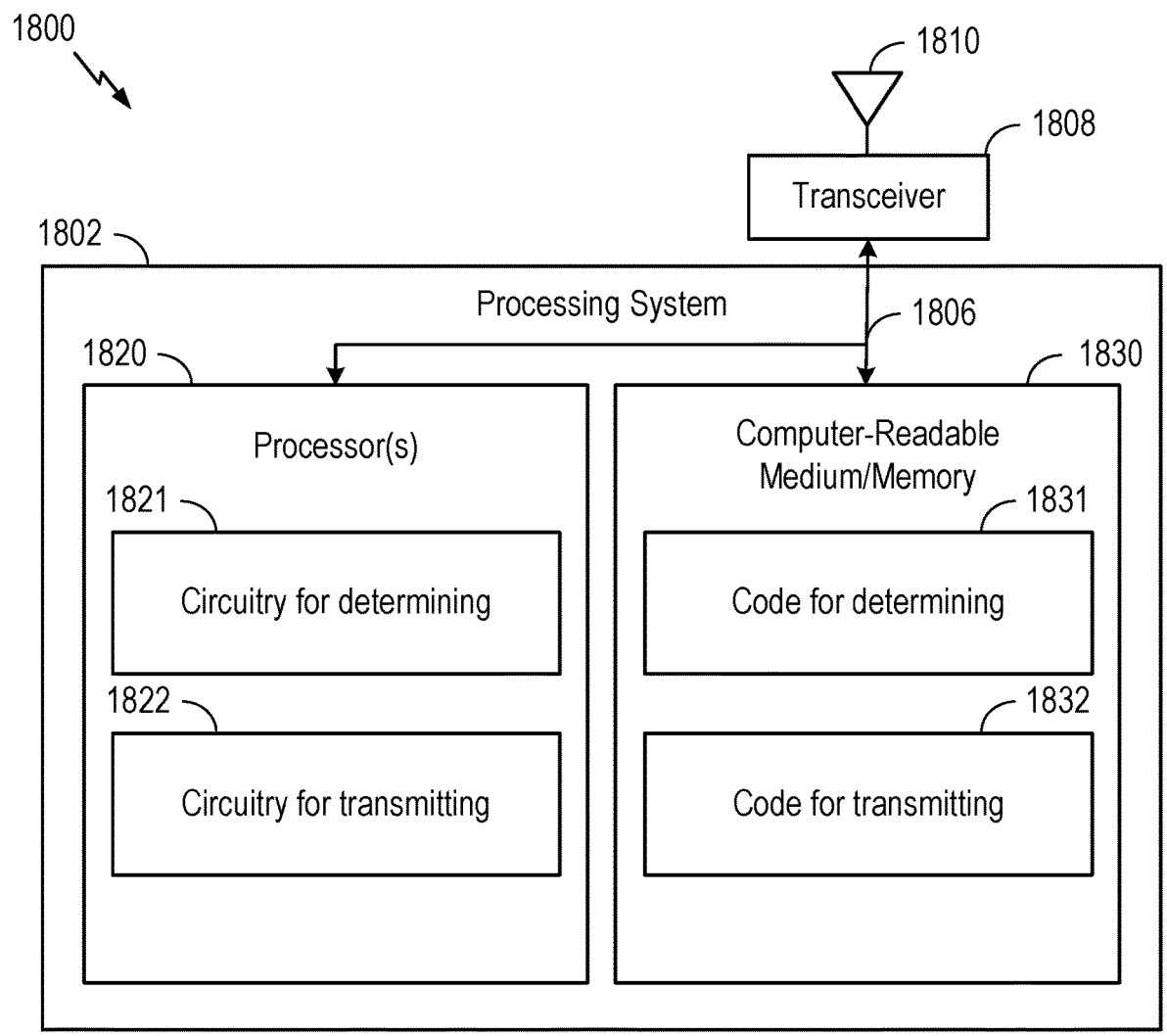

FIG. 18 depicts an example communications device 1800 that includes various components operable, configured, or adapted to perform operations for the techniques disclosed herein, such as the operations depicted and described with respect to FIG. 9 and FIG. 10. In some examples, communication device 1800 may be a base station, such as BS 110*a* as described with respect to FIGS. 1 and 2.

Communications device 1800 includes a processing system 1802 coupled to a transceiver 1808 (e.g., a transmitter and/or a receiver). Transceiver 1808 is configured to transmit (or send) and receive signals for the communications device 1800 via an antenna 1810, such as the various signals as described herein. Processing system 1802 may be configured to perform processing functions for communications device 1800, including processing signals received and/or to be transmitted by communications device 1800.

Processing system 1802 includes one or more processors 1820 coupled to a computer-readable medium/memory 1830 via a bus 1806. In certain aspects, computer-readable medium/memory 1830 is configured to store instructions (e.g., computer-executable code) that when executed by the one or more processors 1820, cause the one or more processors 1820 to perform the operations illustrated in FIGS. 15-16, or other operations for performing the various techniques discussed herein for sidelink synchronization in a network.

In the depicted example, computer-readable medium/memory 1830 stores code 1831 for determining and code 1832 for transmitting.

In the depicted example, the one or more processors 1820 include circuitry configured to implement the code stored in the computer-readable medium/memory 1830, including circuitry 1821 for determining and circuitry 1822 for transmitting.

Various components of communications device 1800 may provide means for performing the methods described herein, including with respect to FIGS. 15-16.

In some examples, means for transmitting or sending (or means for outputting for transmission) may include the transceivers 232 and/or antenna(s) 234 of the base station 102 illustrated in FIG. 2 and/or transceiver 1808 and antenna 1810 of the communication device 1800 in FIG. 18.

In some examples, means for receiving (or means for obtaining) may include the transceivers 232 and/or antenna(s) 234 of the base station illustrated in FIG. 2 and/or transceiver 1808 and antenna 1810 of the communication device 1800 in FIG. 18.

In some examples, means for determining may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including sidelink manager 241).

Notably, FIG. 18 is just one example, and many other examples and configurations of communication device 1800 are possible.

EXAMPLE CLAUSES

Implementation examples are described in the following numbered clauses:

Clause 1: A method for wireless communication by a remote user equipment (UE), comprising: determining at least one synchronization priority associated with synchronization signals for synchronizing to a network; determining relay capability information associated with multiple relay UEs; selecting one relay UE of the multiple relay UEs, based on the synchronization priority and relay capability; and synchronizing to the network using at least one synchronization signal received from the selected one relay UE.

Clause 2: The method of Clause 1, wherein determining the at least one synchronization priority comprises: receiving the synchronization signals from one or more of the multiple relay UEs, each synchronization signal includes an indication of the synchronization priority corresponding to that received synchronization signal; and determining the at least one synchronization priority is based on the indication of the synchronization priority.

Clause 3: The method of any Clauses 1-2, wherein the synchronization signals comprise at least one of: a global navigation satellite system (GNSS) based synchronization signal or a base station based synchronization signal.

Clause 4: The method of any Clauses 1-3, wherein the synchronization priority indicates a priority for using a corresponding synchronization signal to synchronize to the network.

Clause 5: The method of any Clauses 1-2 or 4, wherein the synchronization signals comprise synchronization signal blocks (SSBs).

Clause 6: The method of any Clauses 1-5, wherein determining the relay capability information associated with multiple relay UEs comprises: receiving the relay capability information from each of one or more relay UEs of the multiple relay UEs.

Clause 7: The method of any Clauses 1-6, wherein the relay capability information comprises at least one of: discontinuous reception (DRX) cycle information associated with one or more relay UEs of the multiple relay UEs; channel state information (CSI) associated with a communication link between the one or more relay UEs of the multiple relay UEs and a serving base station; an indication of an amount of traffic on a communication link between the one or more relay UEs of the multiple relay UEs and a serving base station; an indication of an amount of traffic on a sidelink communication between the one or more relay UEs of the multiple relay UEs and one or more other UEs; a channel quality associated with a sidelink communication link of the one or more relay UEs of the multiple relay UEs; a number of other UEs that the one or more relay UEs of the multiple relay UEs connect to; or a time source associated with the one or more relay UEs of the multiple relay UEs.

Clause 8: The method of Clause 7, further comprising determining the channel quality associated with the sidelink communication link of the one or more relay UEs of the multiple relay UEs based on at least one of: a sidelink discovery reference signal received power associated with reference signals received from the one or more relay UEs of the multiple relay UEs; or channel state information reference signal (CSI-RS) measurements associated with the one or more relay UEs of the multiple relay UEs.

Clause 9: The method of any Clauses 1-8, further comprising receiving an indication to prioritize using the relay capability information associated with multiple relay UEs over the synchronization priority associated with synchronization signals from the multiple relay UEs when selecting the one relay UE.

Clause 10: The method of Clause 9, wherein selecting the one relay UE of the multiple relay UEs comprises: determining a relay capability score for each of one or more relay UEs of the multiple relay UEs based on the relay capability information associated with the one or more relay UEs of the multiple relay UEs.

Clause 11: The method of Clause 10, wherein selecting the one relay UE of the multiple relay UEs comprises selecting the one relay UE based on the one relay UE having a highest relay capability score.

Clause 12: The method of any Clauses 10-11, wherein determining the relay capability score for each of one or more relay UEs of the multiple relay UEs comprises: assigning individual weights to parameters included within the relay capability information; and calculating the relay capability score for each of the one or more relay UEs of the multiple relay UEs based, at least in part, on the assigned individual weights.

Clause 13: The method of any of Clauses 10 or 12, wherein selecting the one relay UE of the multiple relay UEs comprises using the synchronization priority associated with synchronization signals from the one relay UE to select the one relay UE if the one relay UE shares a same relay capability score as another relay UE of the multiple relay UEs.

Clause 14: The method of any Clauses 1-13, further comprising receiving an indication to prioritize using the synchronization priority associated with synchronization signals from the multiple relay UEs over the relay capability information associated with multiple relay UEs when selecting the one relay UE.

Clause 15: The method of Clause 14, wherein selecting the one relay UE of the multiple relay UEs comprises selecting the one relay UE based on synchronization signals from the one relay UE having a highest priority.

Clause 16: The method of Clause 15, wherein selecting the one relay UE of the multiple relay UEs comprises using the relay capability information associated with the one relay UE to select the one relay UE if the synchronization signals from the one relay UE shares a same synchronization priority as synchronization signals from another relay UE of the multiple relay UEs.

Clause 17: A method for wireless communication by a remote user equipment (UE), comprising: receiving a broadcast transmission from multiple relay UEs in a network, wherein each broadcast transmission includes relay capability information of a relay UE of the multiple relay UEs; selecting one relay UE of the multiple relay UEs based on the relay capability information; and synchronizing to the network using at least one synchronization signal received from the selected one relay UE.

Clause 18: The method of Clause 17, wherein the broadcast transmission comprises a sidelink master information bock (MIB-SL).

Clause 19: The method of Clause 17, wherein the broadcast transmission comprises a discovery message.

Clause 20: The method of Clause 19, wherein the discovery message is received over a sidelink PC5 interface.

Clause 21: The method of any Clauses 17-20, wherein the broadcast transmission includes a media access control (MAC) frame including the relay capability information.

Clause 22: The method of any Clauses 17-21, wherein: the relay capability information includes parameters indicating information for prioritizing synchronization signals received from the multiple relay UEs; and the one relay UE is selected based on the information for prioritizing synchronization signals.

Clause 23: The method of any Clauses 17-22, wherein the relay capability information comprises at least one of: discontinuous reception (DRX) cycle information associated with the relay UE of the multiple relay UEs; channel state information (CSI) associated with a communication link between the relay UE of the multiple relay UEs and a serving base station; an indication of an amount of traffic on a communication link between the relay UE of the multiple relay UEs and a serving base station; an indication of an amount of traffic on a sidelink communication between relay UE of the multiple relay UEs and one or more other UEs; a channel quality associated with a sidelink communication link of the relay UE of the multiple relay UEs; a number of other UEs that the relay UE of the multiple relay UEs is connected to; or a time source associated with the relay UE of the multiple relay UEs.

Clause 24: A method for wireless communication by a relay user equipment (UE) of multiple relay UEs, comprising: generating a transmission including relay capability information of the relay UE; and transmitting the relay capability information.

Clause 25: The method of Clause 24, wherein the transmission comprises a sidelink master information bock (MIB-SL) transmitted on a slidelink channel.

Clause 26: The method of Clause 24, wherein the transmission comprises a discovery message.

Clause 27: The method of Clause 26, wherein the discovery message is received over a sidelink PC5 interface.

Clause 28: The method of any Clauses 24-27, wherein the transmission includes a media access control (MAC) frame including the relay capability information.

Clause 29: The method of any Clauses 24-28, wherein the relay capability information includes parameters indicating information for prioritizing SSBs transmitted by the multiple relay UEs.

Clause 30: The method of any Clauses 24-29, wherein the relay capability information comprises at least one of: discontinuous reception (DRX) cycle information associated with the relay UE; channel state information (CSI) associated with a communication link between the relay UE and a serving base station; an indication of an amount of traffic on a communication link between the relay UE and a serving base station; an indication of an amount of traffic on a sidelink communication between relay UE and one or more other UEs; a channel quality associated with a sidelink communication link of the relay UE; a number of other UEs that the relay UE is connected to; or a time source associated with the relay UE.

Clause 31: A method for wireless communication by a remote user equipment (UE), comprising: determining a relay capability configuration for selecting one relay UE of multiple relay UEs for synchronizing to a network; selecting one relay UE of the multiple relay UEs, based on the relay capability configuration; and synchronizing to the network using at least one synchronization signal received from the selected one relay UE.

Clause 32: The method of Clause 31, wherein the relay capability configuration provides an indication of which capabilities associated with multiple relay UEs to consider when selecting the one relay UE.

Clause 33: The method of Clause 31, wherein the relay capability configuration provides an indication of which of synchronization priority or relay capability to prioritize when selecting the one relay UE.

Clause 34: The method of any Clauses 31-33, wherein determining the relay capability configuration comprises receiving, from a base station, the relay capability configuration.

Clause 35: The method of Clause 34, wherein determining the relay capability configuration comprises receiving the relay capability configuration in a radio resource control (RRC) message.

Clause 36: The method of any Clauses 31-33, wherein determining the relay capability configuration comprises: receiving multiple relay capability configurations; and receiving an indication of one relay capability configuration of the multiple relay capability configurations to use for selecting the one relay UE.

Clause 37: The method of Clause 36, wherein the relay capability configurations are received via layer 1 or layer 2 signaling.

Clause 38: The method of any Clauses 31-33, wherein determining the relay capability configuration comprises: selecting a relay capability configuration without signaling from a base station indicating which relay capability configuration to select.

Clause 39: A method for wireless communication by a base station (BS) in a network, comprising: determining a relay capability configuration for selecting one relay UE of multiple relay UEs for synchronizing to the network; and transmitting the relay capability configuration to a remote UE.

Clause 40: The method of Clause 39, wherein the relay capability configuration provides an indication of which capabilities associated with the multiple relay UEs to consider when selecting the one relay UE to synchronize to the network with.

Clause 41: The method of Clause 39, wherein the relay capability configuration provides an indication of which of synchronization priority or relay capability to prioritize when selecting the one relay UE to synchronize to the network with.

Clause 42: The method of any Clauses 39-41, wherein transmitting the relay capability configuration comprises transmitting the relay capability configuration in a radio resource control (RRC) message.

Clause 43: The method of any Clauses 39-42, further comprising transmitting multiple relay capability configurations, wherein transmitting the relay capability configuration comprises transmitting an indication of one relay capability configuration of the multiple relay capability configurations to use for selecting the one relay UE to synchronize to the network with.

Clause 44: The method of Clause 43, wherein the multiple relay capability configurations are transmitted via layer 1 or layer 2 signaling.

Clause 45: An apparatus, comprising: a memory comprising executable instructions; and one or more processors configured to execute the executable instructions and cause the apparatus to perform a method in accordance with any one of Clauses 1-44.

Clause 46: An apparatus, comprising means for performing a method in accordance with any one of Clauses 1-44.

Clause 47: A non-transitory computer-readable medium comprising executable instructions that, when executed by one or more processors of an apparatus, cause the apparatus to perform a method in accordance with any one of Clauses 1-44.

Clause 48: A computer program product embodied on a computer-readable storage medium comprising code for performing a method in accordance with any one of Clauses 1-44.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a wireless node, a wireless communications node, a wireless device, a wireless communications device, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform the operations illustrated in one or more of FIGS. 8, 11, 12, 13, 14, and 16.

For example, means for determining may include a processor (e.g., the controller/processor 280) and/or circuitry for configuring (e.g., the circuitry for determining 926). Means for selecting may include a processor (e.g., the controller/processor 280) and/or circuitry for selecting (e.g., the circuitry for selecting 928). Means for synchronizing may include a processor (e.g., the controller/processor 280) and/or circuitry for synchronizing (e.g., the circuitry for synchronizing 930). Means for receiving may include a processor (e.g., the controller/processor 280) and/or circuitry for receiving (e.g., the circuitry for receiving 932). Means for assigning may include a processor (e.g., the controller/processor 280) and/or circuitry for assigning (e.g., the circuitry for assigning 934). Means for calculating may include a processor (e.g., the controller/processor 280) and/or circuitry for calculating (e.g., the circuitry for calculating 936). In certain aspects, various processors and/or various circuitry may include a circuit, a CPU, a GPU, a DSP, an ASIC, a FPGA, or other PLD, discrete gate or transistor logic, discrete hardware components, or any combination thereof designed to perform the functions described here.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4, as well as other operations described herein for avoiding scheduling outages.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims

The invention claimed is:

1. A method for wireless communication by a remote user equipment (UE), comprising:
   receiving, in a radio resource control (RRC) message from a base station, a relay capability configuration comprising an indication to one of:
      prioritize using relay capability information associated with multiple relay UEs over a synchronization priority associated with synchronization signals from the multiple relay UEs when selecting one relay UE of the multiple relay UEs; or
      prioritize using a synchronization priority associated with synchronization signals from multiple relay UEs over relay capability information associated with the multiple relay UEs when selecting one relay UE of the multiple relay UEs;
   receiving the synchronization signals from one or more of the multiple relay UEs, wherein each synchronization signal includes an indication of the synchronization priority corresponding to that received synchronization signal;
   receiving the relay capability information from each of one or more relay UEs of the multiple relay UEs;
   selecting the one relay UE of the multiple relay UEs based on the relay capability configuration and at least one of the synchronization priority or relay capability; and
   synchronizing to a network using at least one synchronization signal received from the selected one relay UE.

2. The method of claim 1, wherein determining the at least one synchronization priority comprises
   determining the at least one synchronization priority based on the indication of the synchronization priority.

3. The method of claim 1, wherein the synchronization signals comprise at least one of: a global navigation satellite system (GNSS) based synchronization signal or a base station based synchronization signal.

4. The method of claim 1, wherein the synchronization priority indicates a priority for using a corresponding synchronization signal to synchronize to the network.

5. The method of claim 1, wherein the synchronization signals comprise synchronization signal blocks (SSBs).

6. The method of claim 1, wherein the relay capability information comprises at least one of:
   discontinuous reception (DRX) cycle information associated with one or more relay UEs of the multiple relay UEs;
   channel state information (CSI) associated with a communication link between the one or more relay UEs of the multiple relay UEs and a serving base station;
   an indication of an amount of traffic on a communication link between the one or more relay UEs of the multiple relay UEs and a serving base station;
   an indication of an amount of traffic on a sidelink communication between the one or more relay UEs of the multiple relay UEs and one or more other UEs;
   a channel quality associated with a sidelink communication link of the one or more relay UEs of the multiple relay UEs;
   a number of other UEs that the one or more relay UEs of the multiple relay UEs connect to; or
   a time source associated with the one or more relay UEs of the multiple relay UEs.

7. The method of claim 6, further comprising determining the channel quality associated with the sidelink communication link of the one or more relay UEs of the multiple relay UEs based on at least one of:
   a sidelink discovery reference signal received power associated with reference signals received from the one or more relay UEs of the multiple relay UEs; or
   channel state information reference signal (CSI-RS) measurements associated with the one or more relay UEs of the multiple relay UEs.

8. The method of claim 1, wherein the received indication is to prioritize using the relay capability information associated with multiple relay UEs over the synchronization priority associated with synchronization signals from the multiple relay UEs when selecting the one relay UE.

9. The method of claim 8, wherein selecting the one relay UE of the multiple relay UEs comprises:
   determining a relay capability score for each of one or more relay UEs of the multiple relay UEs based on the relay capability information associated with the one or more relay UEs of the multiple relay UEs.

10. The method of claim 9, wherein selecting the one relay UE of the multiple relay UEs comprises selecting the one relay UE based on the one relay UE having a highest relay capability score.

11. The method of claim 9, wherein determining the relay capability score for each of one or more relay UEs of the multiple relay UEs comprises:
   assigning individual weights to parameters included within the relay capability information; and
   calculating the relay capability score for each of the one or more relay UEs of the multiple relay UEs based, at least in part, on the assigned individual weights.

12. The method of claim 9, wherein selecting the one relay UE of the multiple relay UEs comprises using the synchronization priority associated with synchronization signals from the one relay UE to select the one relay UE if the one relay UE shares a same relay capability score as another relay UE of the multiple relay UEs.

13. The method of claim 1, wherein the received indication is to prioritize using the synchronization priority associated with synchronization signals from the multiple relay UEs over the relay capability information associated with multiple relay UEs when selecting the one relay UE.

14. The method of claim 13, wherein selecting the one relay UE of the multiple relay UEs comprises selecting the one relay UE based on synchronization signals from the one relay UE having a highest priority.

15. The method of claim 14, wherein selecting the one relay UE of the multiple relay UEs comprises using the relay capability information associated with the one relay UE to select the one relay UE if the synchronization signals from the one relay UE shares a same synchronization priority as synchronization signals from another relay UE of the multiple relay UEs.

16. An apparatus for wireless communication by a remote user equipment (UE), comprising:
one or more processors individually or collectively configured to execute instructions stored on one or more processors and to cause the remote UE to:
receive, in a radio resource control (RRC) message from a base station, a relay capability configuration comprising an indication to one of:
prioritize using relay capability information associated with multiple relay UEs over a synchronization priority associated with synchronization signals from the multiple relay UEs when selecting one relay UE of the multiple relay UEs; or
prioritize using a synchronization priority associated with synchronization signals from multiple relay UEs over relay capability information associated with the multiple relay UEs when selecting one relay UE of the multiple relay UEs;
receive the synchronization signals from one or more of the multiple relay UEs, wherein each synchronization signal includes an indication of the synchronization priority corresponding to that received synchronization signal;
receive the relay capability information from each of one or more relay UEs of the multiple relay UEs;
select the one relay UE of the multiple relay UEs based on the relay capability configuration and at least one of the synchronization priority or relay capability; and
synchronize to a network using at least one synchronization signal received from the selected one relay UE.

17. The apparatus of claim 16, wherein the one or more processors are further configured to cause the remote UE to:
determine the at least one synchronization priority based on the indication of the synchronization priority.

18. The apparatus of claim 16, wherein the synchronization signals comprise at least one of: a global navigation satellite system (GNSS) based synchronization signal or a base station based synchronization signal.

19. The apparatus of claim 16, wherein the synchronization priority indicates a priority for using a corresponding synchronization signal to synchronize to the network.

20. The apparatus of claim 16, wherein the synchronization signals comprise synchronization signal blocks (SSBs).

21. The apparatus of claim 16, wherein the relay capability information comprises at least one of:
discontinuous reception (DRX) cycle information associated with one or more relay UEs of the multiple relay UEs;
channel state information (CSI) associated with a communication link between the one or more relay UEs of the multiple relay UEs and a serving base station;
an indication of an amount of traffic on a communication link between the one or more relay UEs of the multiple relay UEs and a serving base station;
an indication of an amount of traffic on a sidelink communication between the one or more relay UEs of the multiple relay UEs and one or more other UEs;
a channel quality associated with a sidelink communication link of the one or more relay UEs of the multiple relay UEs;
a number of other UEs that the one or more relay UEs of the multiple relay UEs connect to; or
a time source associated with the one or more relay UEs of the multiple relay UEs.

22. The apparatus of claim 21, wherein the one or more processors are further configured to cause the remote UE to:
determine the channel quality associated with the sidelink communication link of the one or more relay UEs of the multiple relay UEs based on at least one of:
a sidelink discovery reference signal received power associated with reference signals received from the one or more relay UEs of the multiple relay UEs; or
channel state information reference signal (CSI-RS) measurements associated with the one or more relay UEs of the multiple relay UEs.

23. The apparatus of claim 16, wherein:
the one or more processors are configured to cause the remote UE to receive the indication to prioritize using the relay capability information associated with multiple relay UEs over the synchronization priority associated with synchronization signals from the multiple relay UEs when selecting the one relay UE, and
in order to select the one relay UE of the multiple relay UEs, the one or more processors are further configured to cause the remote UE to determine a relay capability score for each of one or more relay UEs of the multiple relay UEs based on the relay capability information associated with the one or more relay UEs of the multiple relay UEs.

24. The apparatus of claim 23, wherein, in order to select the one relay UE of the multiple relay UEs, the one or more processors are further configured to cause the remote UE to one of:
select the one relay UE based on the one relay UE having a highest relay capability score, or
use the synchronization priority associated with synchronization signals from the one relay UE to select the one relay UE if the one relay UE shares a same relay capability score as another relay UE of the multiple relay UEs.

25. The apparatus of claim 23, wherein, in order to determine the relay capability score for each of one or more relay UEs of the multiple relay UEs, the one or more processors are further configured to cause the remote UE to:
assign individual weights to parameters included within the relay capability information; and
calculate the relay capability score for each of the one or more relay UEs of the multiple relay UEs based, at least in part, on the assigned individual weights.

26. The apparatus of claim 16, wherein:
the one or more processors are configured to cause the remote UE to receive the indication to prioritize using the synchronization priority associated with synchronization signals from the multiple relay UEs over the relay capability information associated with multiple relay UEs when selecting the one relay UE, and
in order to select the one relay UE of the multiple relay UEs, the one or more processors are further configured to cause the remote UE to:
select the one relay UE based on synchronization signals from the one relay UE having a highest priority, and
use the relay capability information associated with the one relay UE to select the one relay UE if the synchronization signals from the one relay UE shares a same synchronization priority as synchronization signals from another relay UE of the multiple relay UEs.

27. An apparatus for wireless communication, comprising:
   means for receiving, in a radio resource control (RRC) message from a base station, a relay capability configuration comprising an indication to one of:
      prioritize using relay capability information associated with multiple relay UEs over a synchronization priority associated with synchronization signals from the multiple relay UEs when selecting one relay UE of the multiple relay UEs; or
      prioritize using a synchronization priority associated with synchronization signals from multiple relay UEs over relay capability information associated with the multiple relay UEs when selecting one relay UE of the multiple relay UEs;
   means for receive the synchronization signals from one or more of the multiple relay UEs, wherein each synchronization signal includes an indication of the synchronization priority corresponding to that received synchronization signal;
   means for receive the relay capability information from each of one or more relay UEs of the multiple relay UEs;
   means for selecting the one relay UE of the multiple relay UEs based on the relay capability configuration and at least one of the synchronization priority or relay capability; and
   means for synchronizing to a network using at least one synchronization signal received from the selected one relay UE.

28. A non-transitory computer-readable medium for wireless communication, comprising:
   executable instructions that, when executed by one or more processors of an apparatus, cause the apparatus to:
      receive, in a radio resource control (RRC) message from a base station, a relay capability configuration comprising an indication to one of:
         prioritize using relay capability information associated with multiple relay UEs over a synchronization priority associated with synchronization signals from the multiple relay UEs when selecting one relay UE of the multiple relay UEs; or
         prioritize using a synchronization priority associated with synchronization signals from multiple relay UEs over relay capability information associated with the multiple relay UEs when selecting one relay UE of the multiple relay UEs;
      receive the synchronization signals from one or more of the multiple relay UEs, wherein each synchronization signal includes an indication of the synchronization priority corresponding to that received synchronization signal;
      receive the relay capability information from each of one or more relay UEs of the multiple relay UEs;
      select the one relay UE of the multiple relay UEs based on the relay capability configuration and at least one of the synchronization priority or relay capability; and
      synchronize to a network using at least one synchronization signal received from the selected one relay UE.

* * * * *